US012607398B2

(12) United States Patent
Han et al.

(10) Patent No.: US 12,607,398 B2
(45) Date of Patent: Apr. 21, 2026

(54) HOME APPLIANCES INCLUDING LIGHT SENSOR

(71) Applicant: SAMSUNG ELECTRONICS CO., LTD., Suwon-si (KR)

(72) Inventors: Jeongsu Han, Suwon-si (KR); Gwangjin Jung, Suwon-si (KR); Taegyoon Noh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/740,745

(22) Filed: Jun. 12, 2024

(65) Prior Publication Data

US 2025/0052488 A1     Feb. 13, 2025

Related U.S. Application Data

(63) Continuation of application No. PCT/KR2024/006663, filed on May 16, 2024.

(30) Foreign Application Priority Data

Aug. 7, 2023     (KR) ........................ 10-2023-0103011

(51) Int. Cl.
  *F25D 29/00*       (2006.01)
  *F25D 23/12*       (2006.01)
  *G05D 9/12*        (2006.01)
(52) U.S. Cl.
  CPC ......... *F25D 29/005* (2013.01); *F25D 23/126* (2013.01); *G05D 9/12* (2013.01)
(58) Field of Classification Search
  CPC ....... G05D 9/12; F25D 23/126; F25D 29/005; B67D 1/1238; B67D 1/1247

(Continued)

(56) References Cited

U.S. PATENT DOCUMENTS 6,394,153 B2     5/2002  Skell et al.
6,681,585 B1 *   1/2004  Stagg .................... F25D 23/126
                                                       62/177

(Continued)

FOREIGN PATENT DOCUMENTS

JP       2013-190116 A      9/2013
KR          0146751         5/1998

(Continued)

OTHER PUBLICATIONS

International Search Report issued on Aug. 23, 2024 for International Application No. PCT/KR2024/006663.

(Continued)

*Primary Examiner* — Timothy L Maust
(74) *Attorney, Agent, or Firm* — STAAS & HALSEY LLP

(57)     ABSTRACT

A refrigerator may comprise a main body including a storage compartment, a door rotatably connectable to the main body, a water container mounting part disposed in the door, a water container coupleable to and decoupleable from the water container mounting part, and an optical sensor disposed on one surface of a side of the water container mounting part configured to detect whether the water container is coupled to the water container mounting part or detect a water level of the water container. The water container may include a reflection mirror disposed to face the optical sensor and configured to guide light emitted from the optical sensor to a bottom side of the water container or light reflected from the bottom side and guide light reflected by water stored in the water container to the optical sensor.

20 Claims, 31 Drawing Sheets

(58) Field of Classification Search
USPC .......................................................... 141/94
See application file for complete search history.

(56) References Cited

U.S. PATENT DOCUMENTS

| 8,006,502 | B2 | 8/2011 | Kim et al. |
| 9,085,453 | B2 * | 7/2015 | McMahan ............. F25D 23/126 |
| 9,739,517 | B2 | 8/2017 | Root |
| 10,119,752 | B2 | 11/2018 | Jeong et al. |
| 10,829,362 | B2 | 11/2020 | Chernov et al. |
| 10,889,484 | B2 * | 1/2021 | Subramanya ........ B67D 1/1238 |
| 10,947,104 | B2 | 3/2021 | Chernov et al. |
| 11,280,889 | B2 | 3/2022 | Lee et al. |
| 11,339,047 | B2 * | 5/2022 | Chernov ................. G01F 23/80 |
| 2008/0264092 | A1 | 10/2008 | Chase et al. |
| 2014/0166153 | A1 | 6/2014 | Waugh et al. |
| 2015/0121942 | A1 | 5/2015 | Yun et al. |
| 2021/0053812 | A1 | 2/2021 | Chernov et al. |

FOREIGN PATENT DOCUMENTS

| KR | 0168996 | 1/1999 |
| KR | 10-1396973 | 5/2014 |
| KR | 10-2018-0009376 | 1/2018 |
| KR | 10-2018-0036935 | 4/2018 |
| KR | 10-1909252 | 10/2018 |
| KR | 10-2022-0115185 | 8/2022 |
| KR | 10-2459149 | 10/2022 |
| WO | WO 2010/109414 A2 | 9/2010 |

OTHER PUBLICATIONS

Written Opinion issued on Aug. 23, 2024 for International Application No. PCT/KR2024/006663.

* cited by examiner (a)            (b)

(a)            (b)            (c)

HOME APPLIANCES INCLUDING LIGHT SENSOR

CROSS-REFERENCE TO RELATED APPLICATIONS

This application is a continuation application, claiming priority under § 365(c), of an International Application No. PCT/KR2024/006663, filed on May 16, 2024, which is based on and claims from the benefit of Korean patent application number 10-2023-0103011, filed on Aug. 7, 2023, in the Korean Intellectual Property Office, the disclosures of which is incorporated by reference herein in its entirety.

BACKGROUND

1. Field

Various embodiments of the disclosure relate to home appliances capable of detecting whether a water container is coupled and/or a water level of the water container using a single optical sensor.

2. Description of Related Art

A refrigerator is a home appliance that has storage compartments inside and a cold air supply device for supplying cold air to the storage compartments to maintain a certain desired temperature, thereby keeping items, such as food, fresh.

In addition to keeping food fresh, the refrigerator may have various other functions for a user convenience. As an example, the refrigerator may have a function of supplying water to a container, such as a water container. For example, the refrigerator may include a dispenser that provides water to outside of the refrigerator by manipulating an input device, such as a touch panel without the user opening the door.

In addition to the dispenser, the refrigerator may include a water supply device configured to detect the water level of the coupled water container and fill the water container with a predetermined amount of water when the water container is coupled (or mounted in a water container mounting space without the user manipulating the input device.

SUMMARY

Generally, the refrigerator includes a first sensor (e.g., water container mounting sensor) to detect whether the water container is coupled to the water container mounting space and a separate second sensor (e.g., water level sensor) to detect the water level of the water container when the water container is coupled to the water container mounting space. In this case, as two or more sensors are required to detect whether the water container is coupled and the water level of the water container, costs for the sensing modules may increase.

According to various embodiments of the disclosure, there may be provided a home appliance capable of detecting whether the water container is coupled and/or the water level of the water container using one optical sensor.

A refrigerator according to an embodiment of the disclosure may comprise a main body including a storage compartment, a door rotatably connected to the main body, a water container mounting part disposed in the door, a water container coupleable to and decoupleable from the water container mounting part, and an optical sensor on one surface of a side of the water container mounting part and configured to detect whether the water container is coupled to the water container mounting part or a detects water level of the water container coupled to the water container mounting part. The water container may include a reflection mirror disposed to face the optical sensor and configured to guide light emitted from the optical sensor to a bottom side of the water container and light reflected from the bottom side and guide light reflected by water stored in the water container to the optical sensor.

According to an example embodiment, the refrigerator may further comprise a controller configured to calculate a light traveling distance based on a time value of light emitted from a light emitting element of the optical sensor and received by a light receiving element of the optical sensor and determine whether the water container is coupled to the water container mounting part and measure the water level of the water container coupled to the water container mounting part based on the calculated light traveling distance.

According to an embodiment, the controller may be configured to determine whether the water container is coupled to the water container mounting part by comparing the calculated light traveling distance with a predefined first light traveling distance and, based on the light traveling distance not being substantially same as the predefined first light traveling distance, determine that the water container is coupled to the water container mounting part.

According to an embodiment, the controller may be configured to, based on the light traveling distance being substantially same as the first light traveling distance, calculate a dispersion of time values measured for a predetermined time and determine whether the water container is coupled to the water container mounting part considering the calculated dispersion and determine that the water container is not coupled to the water container mounting part based on the dispersion being smaller than a predefined dispersion and determine that the water container is coupled to the water container mounting part based on the dispersion being larger than the predefined dispersion.

According to an embodiment, any one of an anti-reflection structure, a diffuse-reflection structure, a hole, and an inclined structure may be disposed on another surface of a side of the water container mounting part, facing the one surface of the side.

According to an embodiment, the controller may be configured to determine whether the calculated light traveling distance is a predefined minimum value or more and, based on the calculated light traveling distance being smaller than the predefined minimum value, determine that the water container is not coupled to the water container mounting part.

According to an embodiment, the refrigerator may further comprise an output device disposed in one area of the water container mounting part and configured to output whether the water container is coupled to the water container mounting part or the water level of the water container coupled to the water container mounting part.

According to an embodiment, the controller may be configured to, based on the water container being coupled to the water container mounting part, determine whether the water container is empty by comparing the calculated light traveling distance with a predefined second light traveling distance and determine that the water container is empty based on the light traveling distance being substantially same as the second light traveling distance and determine that the water container is not empty based on the light traveling distance not being substantially same as the second light traveling distance.

According to an embodiment, the refrigerator may further include a water supply valve to adjust water supply to the water container and an input device disposed in one area of the water container mounting part and configured to receive a command regarding water supply from a user. The controller may be configured to, while the water container is empty, control the water supply valve to allow the water level of the water container to reach a target water supply level based on the target water supply level being input to the input device and control the water supply valve to allow the water level of the water container to reach a predefined water level based on the target water supply level not being input to the input device.

According to an embodiment, the refrigerator may further include a water supply valve to adjust water supply to the water container and an input device disposed in one area of the water container mounting part and configured to receive a command regarding water supply from a user. The controller may be configured to, based on the water container being determined not to be empty, determine whether the water level of the water container is at a full water level and, based on the water level of the water container being determined not to be at the full water level, control the water supply valve to allow the water level of the water container to reach a target water supply level based on the target water supply level being input to the input device and control the water supply valve to allow the water level of the water container to reach a predefined water level based on the target water supply level not being input to the input device.

According to an embodiment, the water container may include a water container main body and an inner case disposed in the water container main body and having a first opening formed in one surface of a side and a second opening, adjacent to the first opening, formed in a bottom side perpendicular to the one surface of the side. The reflection mirror may include a reflection surface connected to each of the first opening and the second opening.

According to an embodiment, the reflection mirror may be disposed in a corner of the inner case.

According to an embodiment, the reflection surface may have an inclination from the first opening or the second opening.

According to an embodiment, a surface of the reflection surface may be plated with a high-reflectivity metal or coated with a high-reflectivity paint.

According to an embodiment, the reflection surface may have a concave shape.

According to an embodiment, a separation distance between the optical sensor and the water container may be 2 mm or less.

A refrigerator according to an embodiment of the disclosure may comprise a main body including a storage compartment, a door rotatably connected to the main body, a water container mounting part received in the door, a water container coupleable to and decoupleable from the water container mounting part, and an optical sensor disposed to penetrate an upper side of the water container mounting part and configured to detect whether the water container is coupled to the water container mounting part or detect a water level of the water container coupled to the water container mounting part. The water container may include a water container main body having an upper side that is open, a water container cover to cover the upper side of the water container main body and the water container cover including a transparent panel disposed to face the optical sensor, and an inner case disposed in the water container main body and having a hole formed in an upper side to be positioned to face the transparent panel.

According to an embodiment, a separation distance between the optical sensor and the transparent panel may be 2 mm or more.

According to an embodiment, the refrigerator may further comprise a controller configured to calculate a light traveling distance based on a time value of light emitted from a light emitting element of the optical sensor and received by a light receiving element of the optical sensor and determine whether the water container is coupled to the water container mounting part and measure the water level of the water container coupled to the water container mounting part based on the calculated light traveling distance. The controller may be configured to control the light emitting element to emit light into an inside of the water container mounting part several times or more and exclude time values lower than a predefined time among time values based on light being emitted from the light emitting element and is received by the light receiving element when calculating the light traveling distance.

A clothing care device according to an embodiment of the disclosure may comprise a main body forming an inner space to receive clothing, a door rotatably connected to the main body to open and to close the inner space, a water container disposed at a lower portion of the inner space and coupleable to and decoupleable from the main body, an optical sensor including a light emitting element and a light receiving element to detect a water level of the water container, and a controller configured to calculate a light traveling distance based on a time value based on light emitted from the light emitting element being received by the light receiving element and measure a water level of the water container based on the calculated light traveling distance. The water container may include a partitioning wall dividing an inner space of the water container into a first space where water is stored and a second space where the optical sensor is disposed and having a hole through which the light passes.

A water container coupleable to a home appliance including an optical sensor, according to an embodiment of the disclosure, may comprise a water container main body to store water, an inner case disposed in the water container main body and having a first opening formed in one surface of a side and a second opening, adjacent to the first opening, formed in a bottom side perpendicular to the one surface of the side, and a reflection mirror disposed to face the optical sensor and configured to guide light emitted from the optical sensor to a bottom side of the water container and light reflected from the bottom side and light reflected by water stored in the water container to the optical sensor. The reflection mirror may include a reflection surface connected to each of the first opening and the second opening.

Various embodiments of the disclosure may detect in real-time whether the water container is coupled to the home appliance and the water level of the coupled water container through the reflection mirror provided in the water container and one optical sensor provided in the home appliance, thereby reducing the costs of the sensing module and enhancing production efficiency.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

6

Figure 19A:
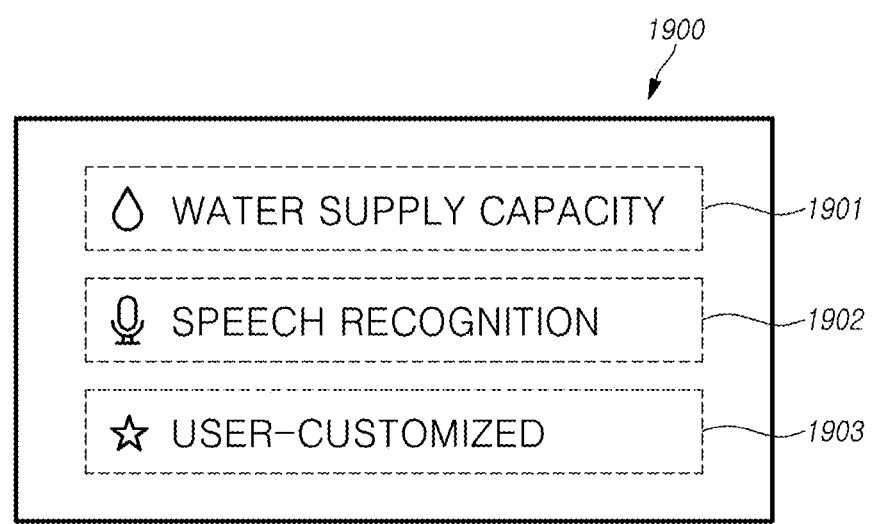
FIG. 19A is a view illustrating a screen regarding a water supply setting displayed on an input/output device according to an embodiment of the disclosure.
Figure 19B:
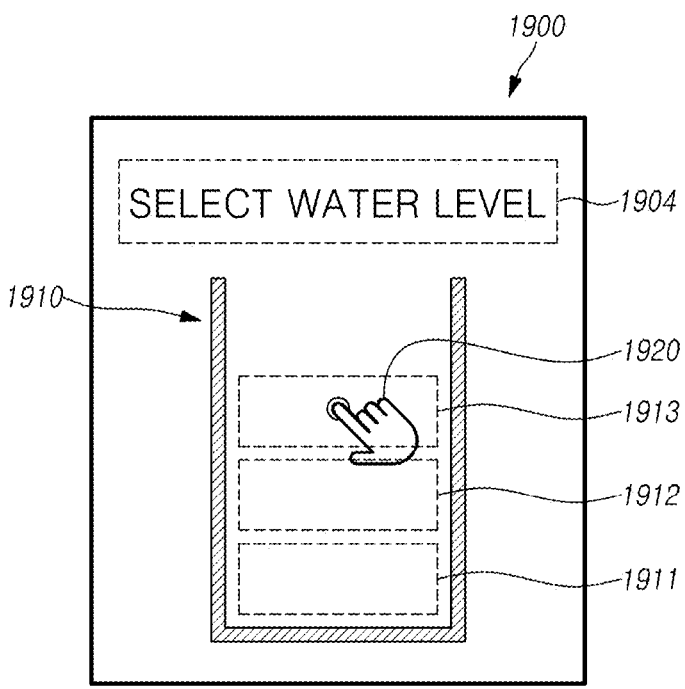
FIG. 19B is a view illustrating a screen regarding a water level setting of a water container displayed on an input/output device during water supply according to an embodiment of the disclosure.
Figure 19C:
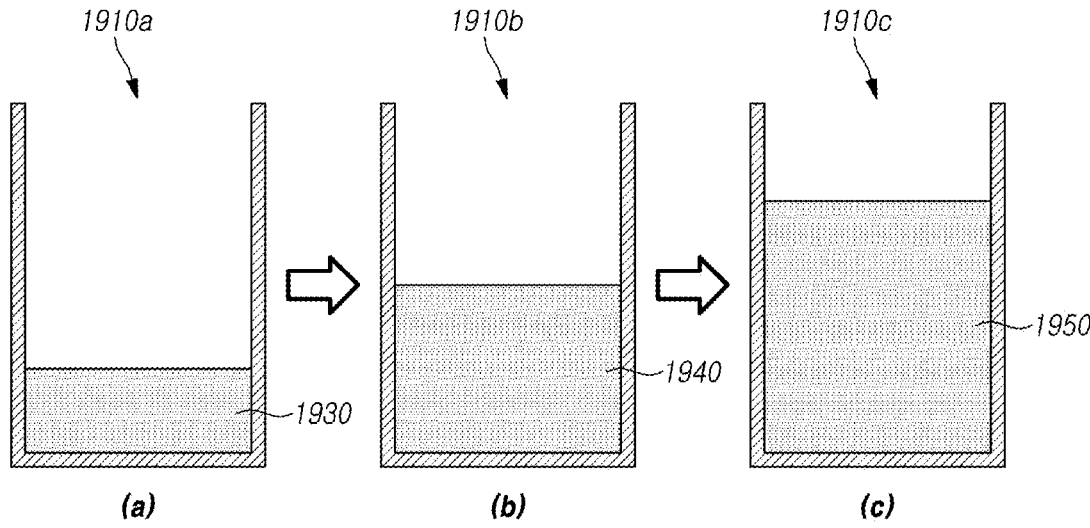
Figure 20:
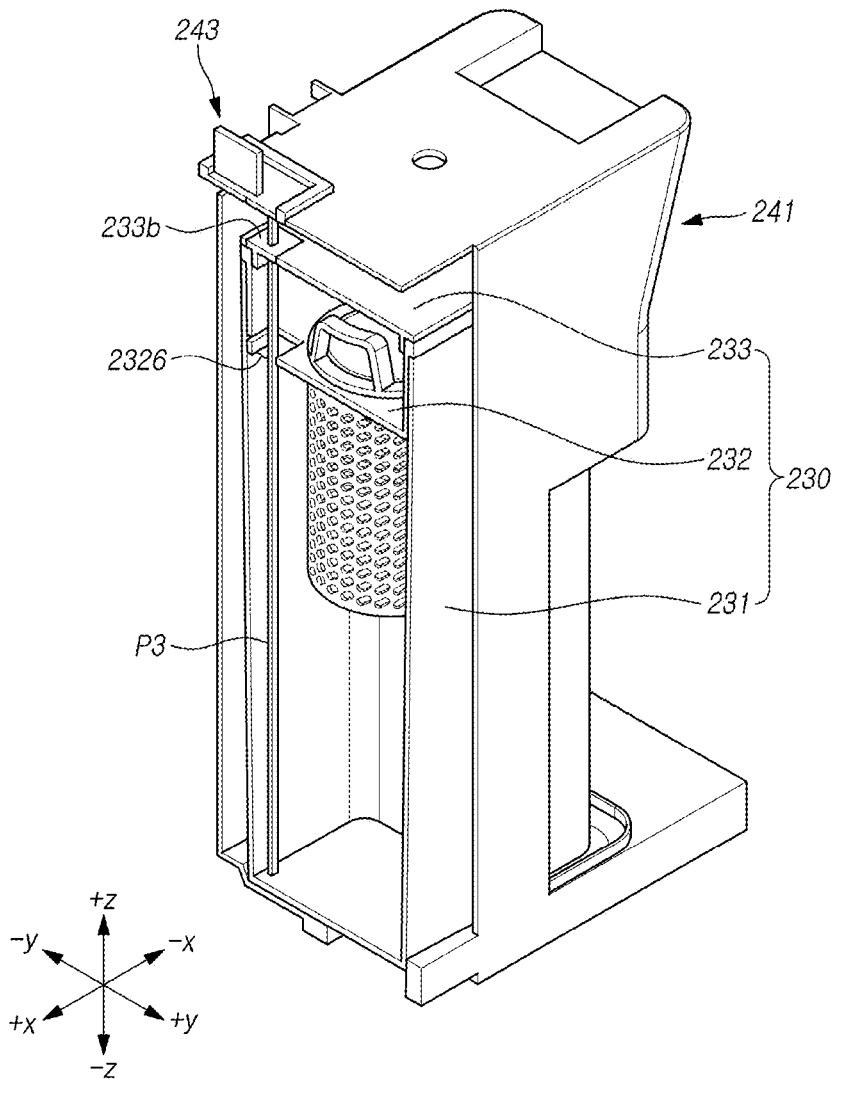
Figure 21:
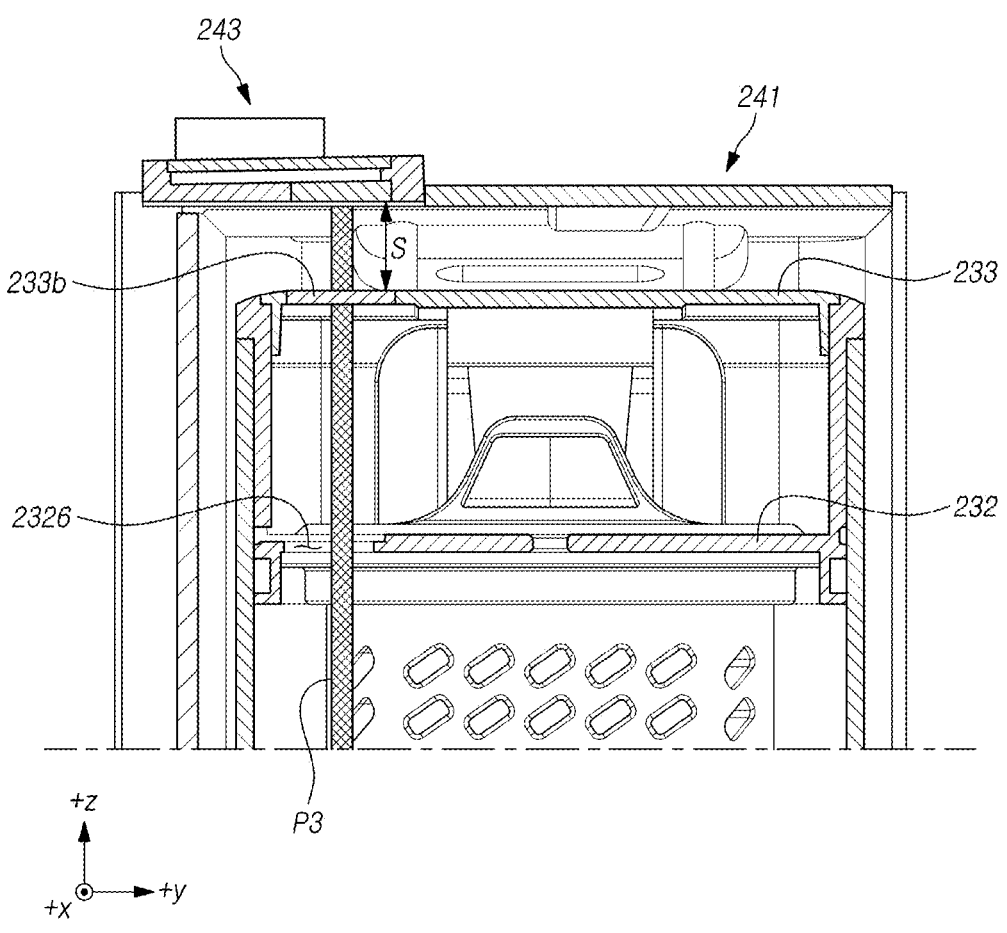
Figure 22:
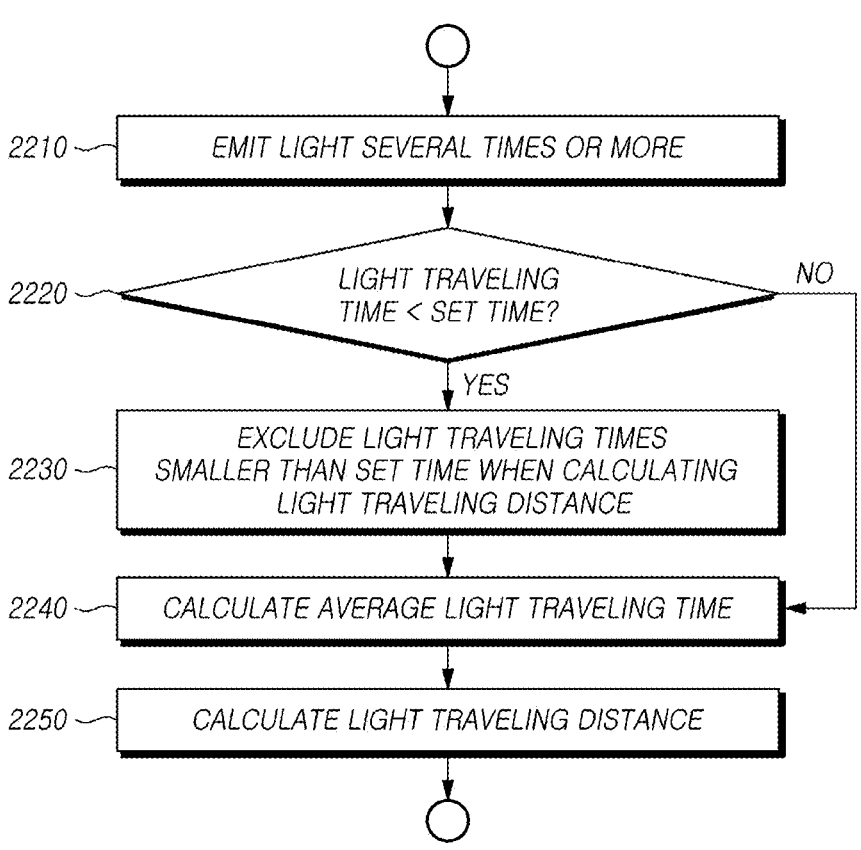
Figure 23:
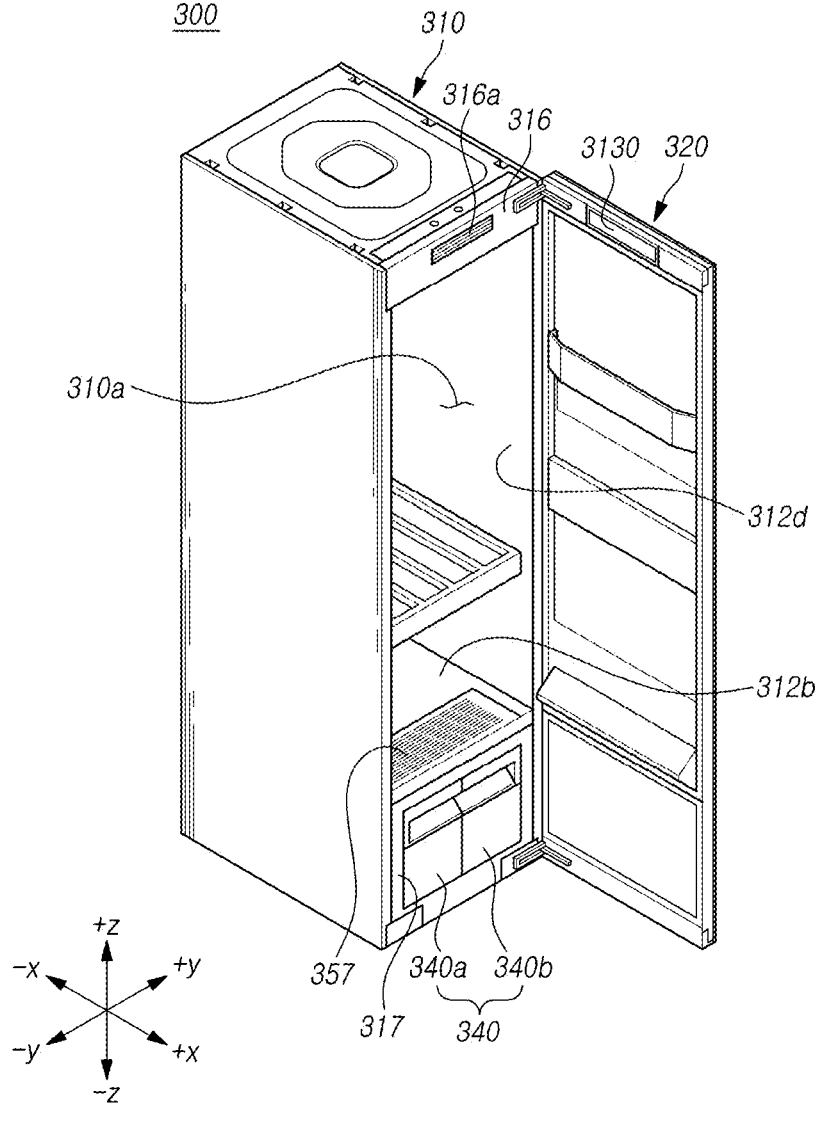
Figure 24:
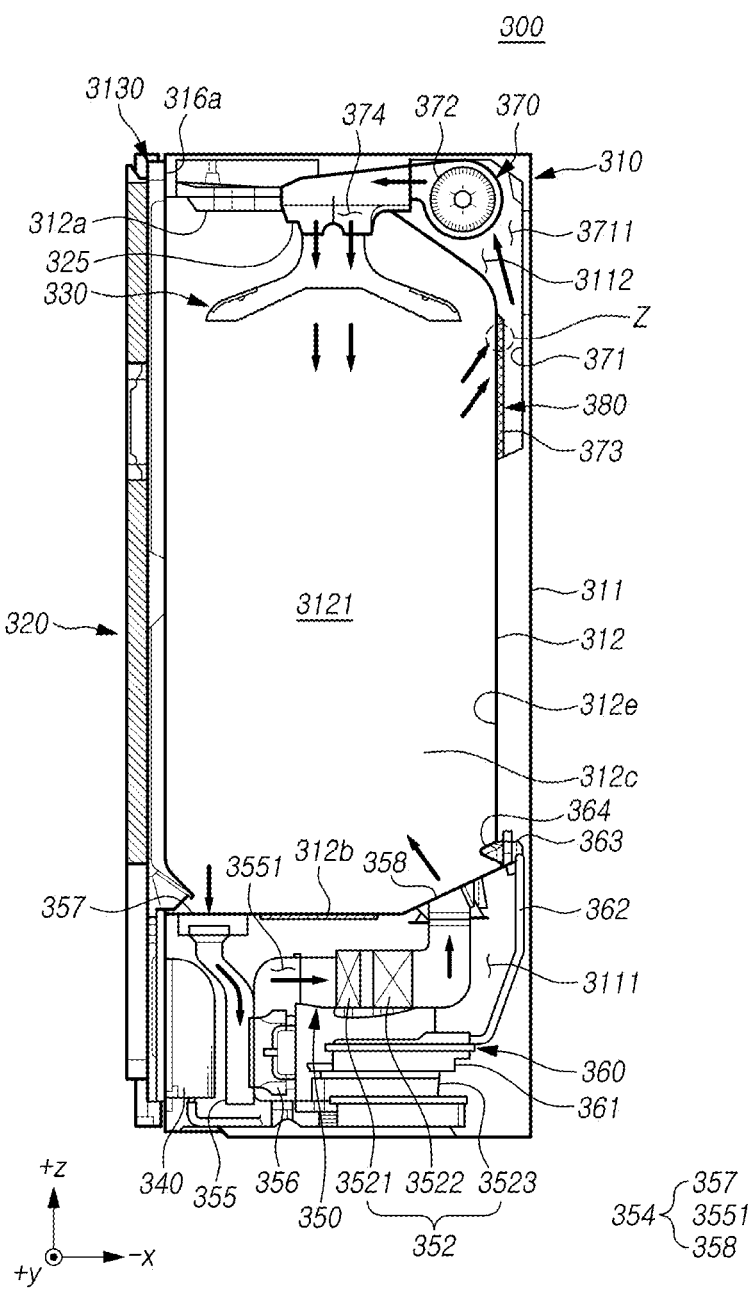
Figure 25:
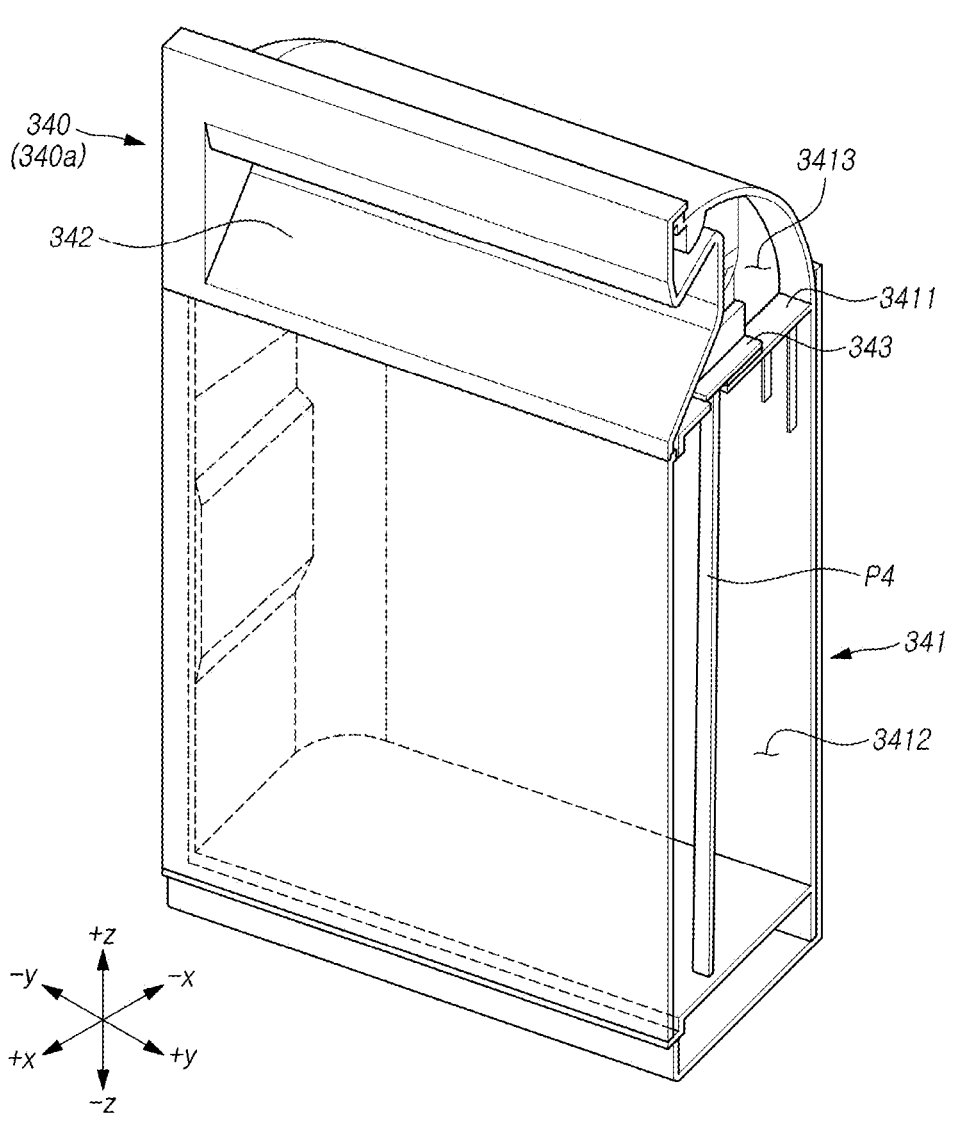
Figure 26:
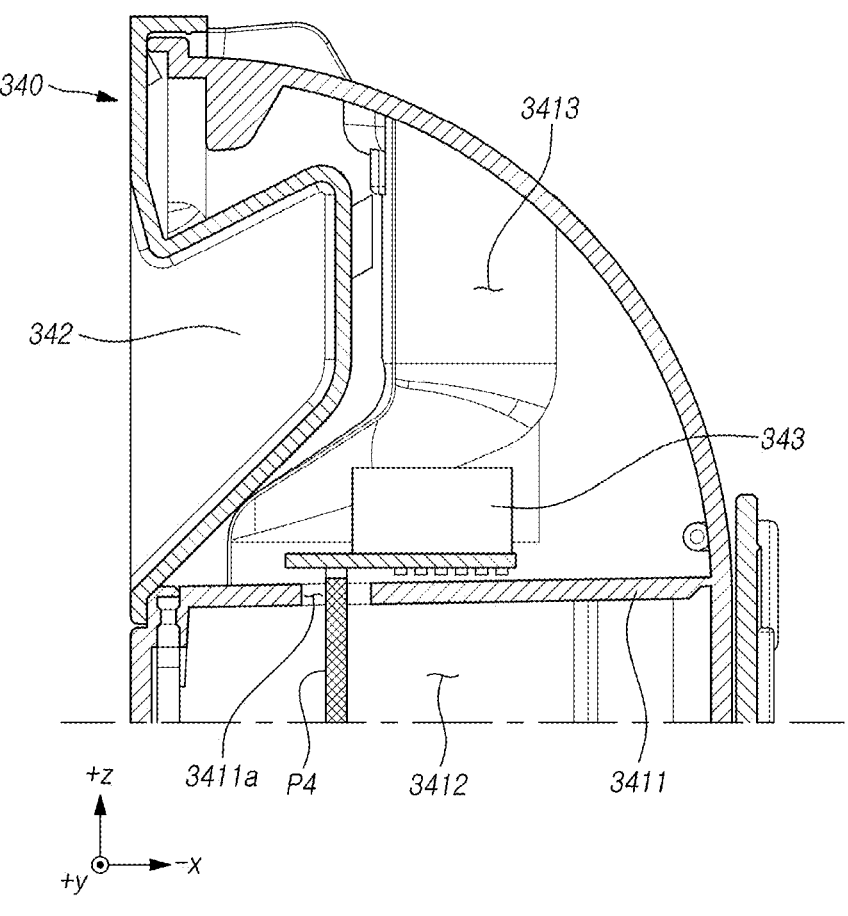
Figure 27:
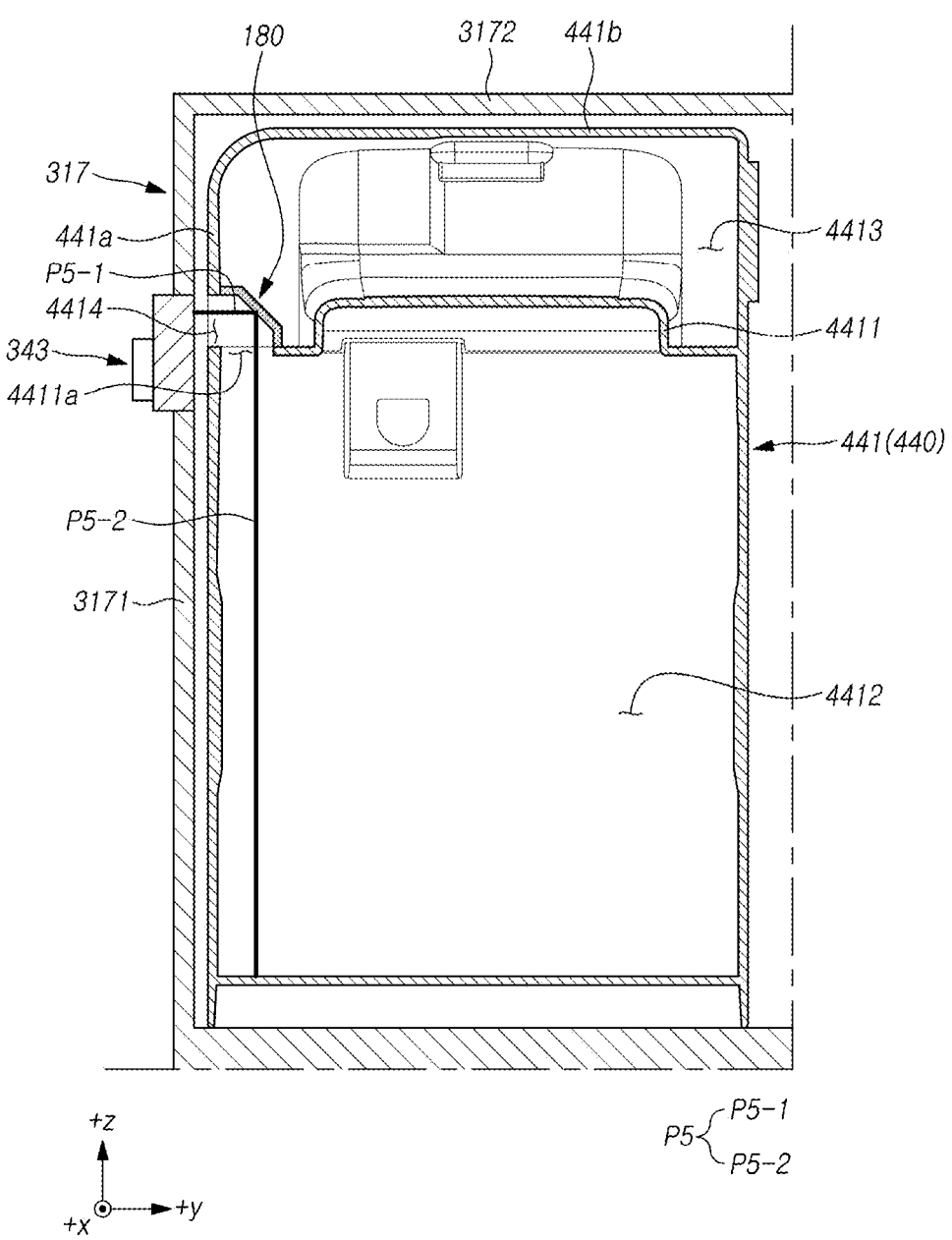
Figure 28:
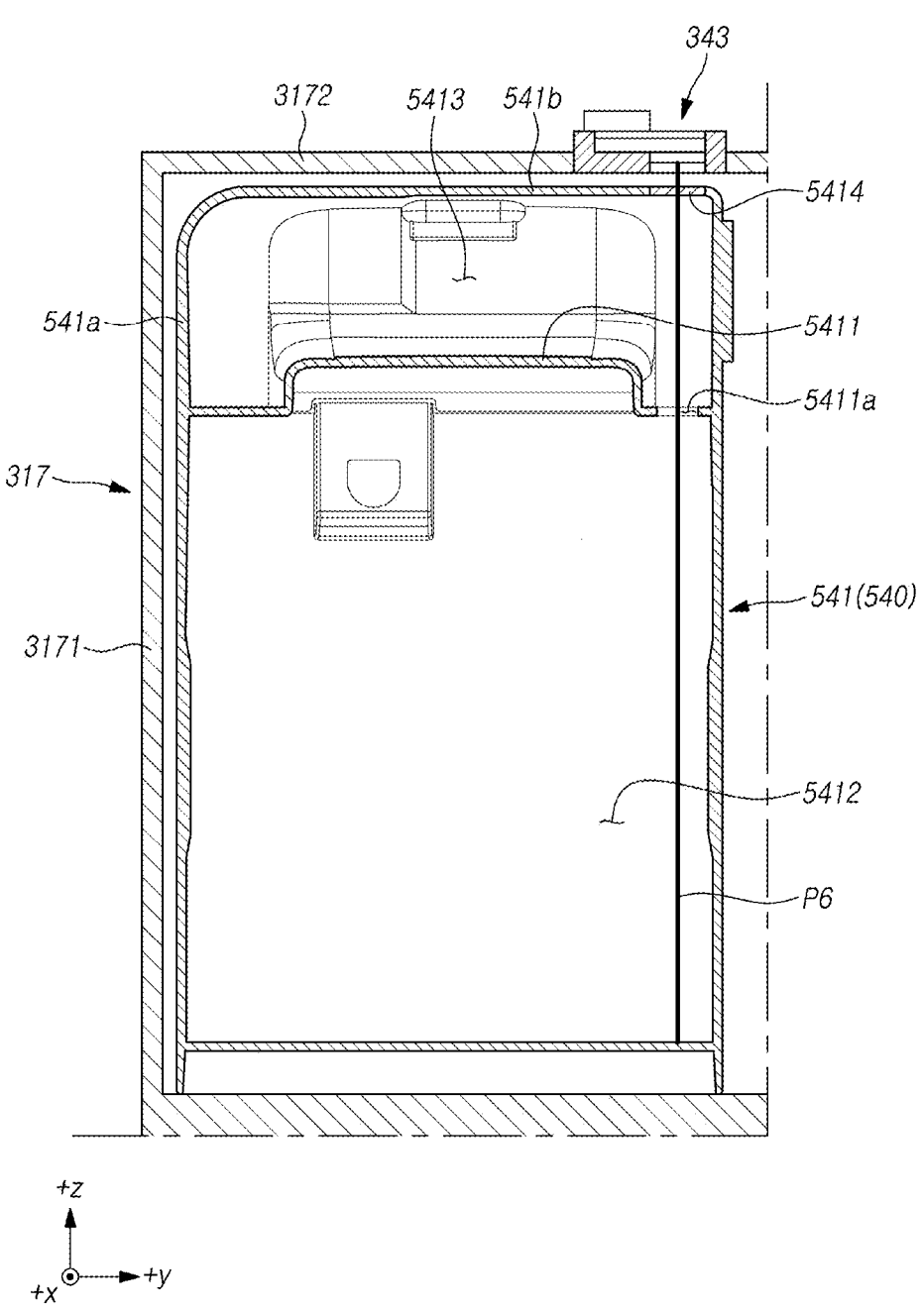

FIG. 19C is a view illustrating a screen regarding a progress of water supply displayed on an input/output device during water supply according to an embodiment of the disclosure;

FIG. 20 is a cross-sectional view illustrating a water container coupled to a water container mounting part according to an embodiment of the disclosure;

FIG. 21 is an enlarged view illustrating a portion of a cross section of a water container coupled to a water container mounting part according to an embodiment of the disclosure;

FIG. 22 is a control flowchart illustrating a refrigerator according to an embodiment of the disclosure;

FIG. 23 is a perspective view illustrating a clothing care device according to an embodiment of the disclosure;

FIG. 24 is a cross-sectional view illustrating a clothing care device according to an embodiment of the disclosure;

FIG. 25 is a cross-sectional view illustrating a water container according to an embodiment of the disclosure;

FIG. 26 is an enlarged view illustrating a portion of a cross section of a water container according to an embodiment of the disclosure;

FIG. 27 is a cross-sectional view illustrating a state in which a water container is coupled to a water container mounting part of a clothing care device according to an embodiment of the disclosure; and FIG. 28 is a cross-sectional view illustrating a state in which a water container is coupled to a water container mounting part of a clothing care device according to an embodiment of the disclosure.

The same or similar reference denotations may be used to refer to the same or similar elements throughout the specification and the drawings.

DETAILED DESCRIPTION

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It will be further understood that the terms "comprise" and/or "have," as used herein, specify the presence of stated features, integers, steps, operations, elements, and/or components, but do not preclude the presence or addition of one or more other features, integers, steps, operations, elements, components, and/or groups thereof.

It will be understood that when a component is referred to as "connected to," "coupled to", "supported on," or "contacting" another component, the components may be connected to, coupled to, supported on, or contact each other directly or via a third component.

Throughout the specification, when one component is positioned "on" another component, the first component may be positioned directly on the second component, or other component(s) may be positioned between the first and second component.

The term "and/or" may denote a combination(s) of a plurality of related components as listed or any of the components.

Hereinafter, the working principle and embodiments of the disclosure are described with reference to the accompanying drawings.

The disclosure relates to a sensing system capable of detecting whether a water container is coupled to a home appliance and detecting a water level of the coupled water container with a single sensor.

Hereinafter, an embodiment in which the sensing system for detecting whether the water container is coupled and the water level of the water container is provided in the refrigerator is described.

The refrigerator according to an embodiment may include a main body.

The "main body" may include an inner case, an outer case disposed outside the inner case, and an insulator provided between the inner case and the outer case.

The "inner case" may include at least one of a case, a plate, a panel, or a liner forming a storage compartment. The inner case may be formed as a single body or may be formed by assembling a plurality of plates. The "outer case" may form an outer appearance of the main body and may be coupled to an outside of the inner case so that the insulator is disposed between the inner case and the outer case.

The "insulator" may insulate an inside of the storage compartment and an outside of the storage compartment so that a temperature inside the storage compartment is maintained at a set appropriate temperature without being affected by an external environment of the storage compartment. According to an embodiment, the insulator may include a foam insulator. The foam insulator may be formed by injecting and foaming a urethane foam mixed with a polyurethane and a foaming agent between the inner case and the outer case.

According to an embodiment, the insulator may further include a vacuum insulator in addition to the foam insulator, or the insulator may be composed of only a vacuum insulator without the foam insulator. The vacuum insulator may include a core material and a cover material, which is configured to receive the core material and to seal an interior with a pressure of or close to vacuum. However, the insulator is not limited to the foam insulator or the vacuum insulator and may include various other materials that may be used for insulation.

The "storage compartment" may include a space defined by the inner case. The storage compartment may further include the inner case that defines the space corresponding to the storage compartment. Various items, such as food, medicine, or cosmetics, may be stored in the storage compartment, and the storage compartment may be formed so that at least one side thereof is opened for access to the items.

The refrigerator may include one or more storage compartments. If two or more storage compartments are formed in the refrigerator, each storage compartment may have a different use and may be maintained at a different temperature. To that end, each storage compartment may be partitioned from each other by a partition wall which may include the insulator.

The storage compartment may be provided to be maintained in an appropriate temperature range according to the use, and may include a "refrigerating compartment", a "freezing compartment", or an "adjustable-temperature compartment" divided according to use and/or temperature range thereof. The refrigerating compartment may be maintained at an appropriate temperature for refrigerated storage items, and the freezing compartment may be maintained at an appropriate temperature for frozen storage items. The term "refrigerating" may mean cooling the item to an extent that the item is not frozen, and for example, the refrigerating compartment may be maintained in a range of 0 degrees Celsius to 7 degrees Celsius. The term "freezing" may mean cooling the item to freeze or remain frozen, and for example, the freezing compartment may be maintained in a range of minus 20 degrees Celsius to minus 1 degree Celsius. The adjustable-temperature compartment may be used as any one of the refrigerating compartment or the freezing compartment regardless of a user's choice.

The storage compartment may be referred to as a "vegetable compartment," a "fresh compartment," a "cooling compartment," an "ice-making compartment," and the like, in addition to the names "refrigerating compartment," "freezing compartment," and "adjustable-temperature compartment, and the terms "refrigerating compartment," "freezing compartment," and "adjustable-temperature compartment" used below should be understood to collectively mean storage compartments having their respective corresponding uses and temperature ranges.

According to an embodiment, the refrigerator may include at least one door configured to open and close one open side of the storage compartment. The door may be provided to open and close each of one or more storage compartments, or one door may be provided to open and close a plurality of storage compartments. The door may be rotatably or slidably installed on a front side of the main body.

The "door" may be configured to seal the storage compartment when the door is closed. Like the main body, the door may include an insulator to insulate the storage compartment when the door is closed.

According to an embodiment, the door may include a door outer plate forming a front side of the door, a door inner plate forming a rear side of the door and facing the storage compartment, an upper cap, a lower cap, and a door insulator provided therein inside.

A gasket may be provided on an edge of the door inner plate so as to seal the storage compartment by being in close contact with the front side of the main body when the door is closed. The door inner plate may include a dyke (e.g., support or hanger) protruding rearward to mount or couple a door basket capable of storing an object.

According to an embodiment, the door may include a door body and a front panel detachably coupled to a front side of the door body and forming the front side of the door. The door body may include the door outer plate forming the front side of the door body, the door inner plate forming the rear side of the door body and facing the storage compartment, the upper cap, the lower cap, and the door insulator provided therein inside.

The refrigerator may be classified into a French door type, a side-by-side type, a bottom mounted freezer (BMF), a top mounted freezer (TMF), or a one-door refrigerator according to the arrangement of the door and the storage compartment.

According to an embodiment, the refrigerator may include a cold air supply device configured to supply cold air to the storage compartment.

The "cold air supply device" may include a machine, an instrument, an electronic device, and/or a system combining the machine, the instrument, and the electronic device capable of generating cold air and guiding the cold air to cool the storage compartment.

According to an embodiment, the cold air supply device may generate cold air through a refrigerating cycle including processes of compressing, condensing, expanding, and evaporating a refrigerant. To that end, the cold air supply device may include a refrigerating cycle device having a compressor, a condenser, an expansion device, and an evaporator capable of driving the refrigerating cycle. According to an embodiment, the cold air supply device may include a semiconductor such as a thermoelectric element. The thermoelectric element may cool the storage compartment by heating and cooling through the Peltier effect.

According to an embodiment, the refrigerator may include a machine room in which at least some components belonging to the cold air supply device are arranged.

The "machine room" may be provided to be partitioned and insulated from the storage compartment to prevent heat generated from components disposed in the machine room from being transferred to the storage compartment. Inside of the machine room may be configured to communicate with an outside of the main body to dissipate heat from components disposed inside the machine room.

According to an embodiment, the refrigerator may include a dispenser provided on (or in) the door to provide water and/or ice. The dispenser may be provided on (or in) the door to be accessible without the user opening the door.

According to an embodiment, the refrigerator may include an ice maker provided to generate ice. The ice maker may include an ice making tray for storing or receiving water, an ice moving device for separating and transporting ice generated by the ice making tray, and an ice bucket for storing the ice generated by the ice making tray.

According to an embodiment, the refrigerator may include a controller for controlling the refrigerator.

The "controller" may include a memory for storing a program and/or data associated with controlling the refrigerator, and a processor for outputting a control signal for controlling the cold air supply device according to the program and/or data stored in the memory.

The memory may be configured to store various information, such as data, instructions, or programs, necessary for an operation of the refrigerator. The memory may store temporary data generated while generating a control signal for controlling components included in the refrigerator. The memory may include at least one of a volatile memory and a non-volatile memory or a combination thereof.

The processor may control overall operation of the refrigerator. The processor may control the components of the refrigerator by executing the program stored in the memory. The processor may include a separate neural processing unit (NPU) that performs an operation of the artificial intelligence model. The processor may include a central processing unit, a dedicated graphics processor (GPU), and the like. The processor may generate the control signal for controlling the operation of the cold supply device. For example, the processor may receive temperature information about the storage compartment from a temperature sensor and generate a cooling control signal for controlling the operation of the cold air supply device based on the temperature information about the storage compartment.

Further, the processor may process user input of an user interface according to the program and/or data memorized/stored in the memory, and control the operation of the user interface. The user interface may be provided using an input interface and an output interface. The processor may receive the user input from the user interface. Further, the processor may transfer a display control signal and image data for displaying an image on the user interface to the user interface in response to the user input.

The processor and the memory may be provided integrally or separately. The processor may include one or more processors. For example, the processor may include a main processor and at least one sub-processor. The memory may include one or more memories.

The refrigerator may include a processor and a memory controlling all components included in the refrigerator, and a plurality of processors and a plurality of memories individually controlling the components of the refrigerator. For example, the refrigerator may include a processor and a memory controlling the operation of the cold air supply device according to the output of the temperature sensor. Further, the refrigerator may include a separate processor and a separate memory controlling the operation of the user interface according to a user input.

A communication module may communicate with an external device such as a server, a mobile device, another home appliance, or the like through an access point (AP). The AP may connect the local area network (LAN) to which the refrigerator or a user equipment is connected to a wide area network (WAN) to which the server is connected. The refrigerator or the user equipment may be connected to the server through the WAN.

The input interface may include a key, a touch screen, a microphone, and the like. The input interface may receive the user input and transfer the user input to the processor.

The output interface may include a display, a speaker, and the like. The output interface may output various notifications, messages, information, and the like generated by the processor.

Hereinafter, a refrigerator according to various embodiments is described in detail with reference to the accompanying drawings.

Figure 1:
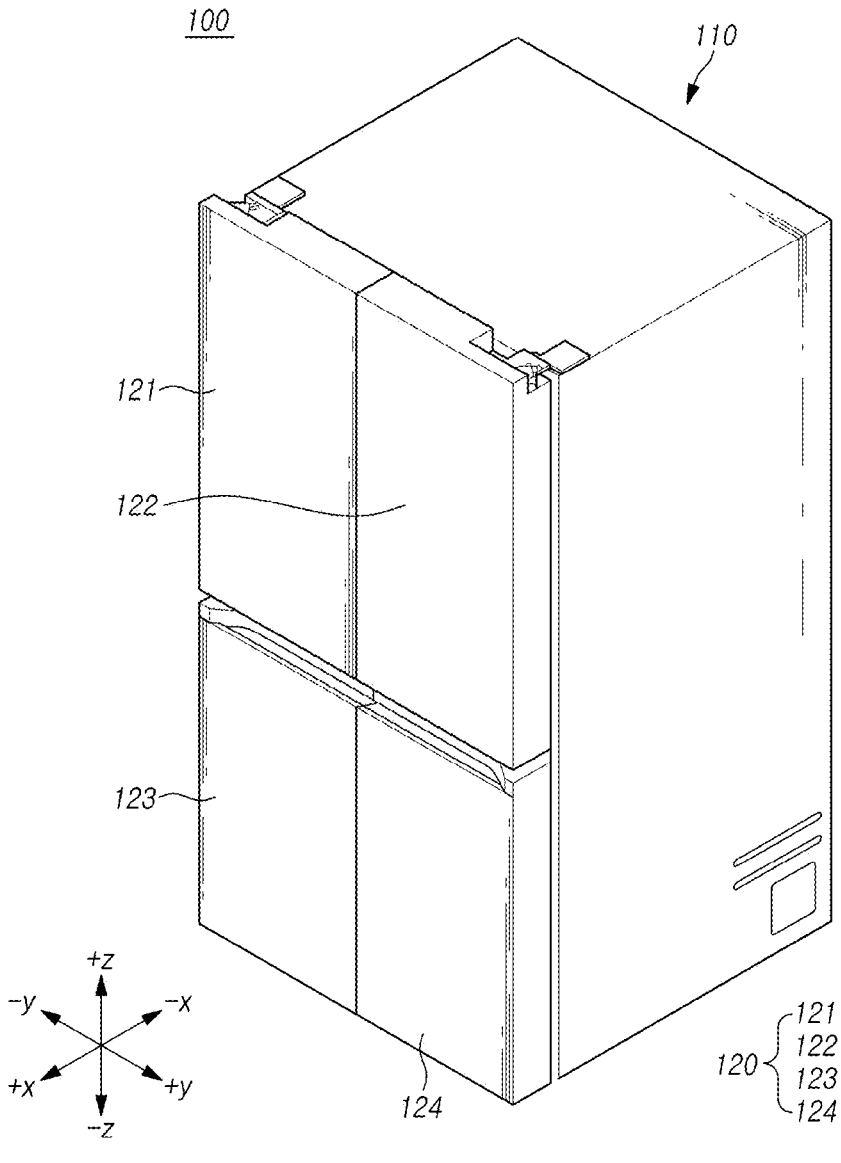
FIG. 1 is a perspective view illustrating a refrigerator according to an embodiment of the disclosure.
Figure 2:
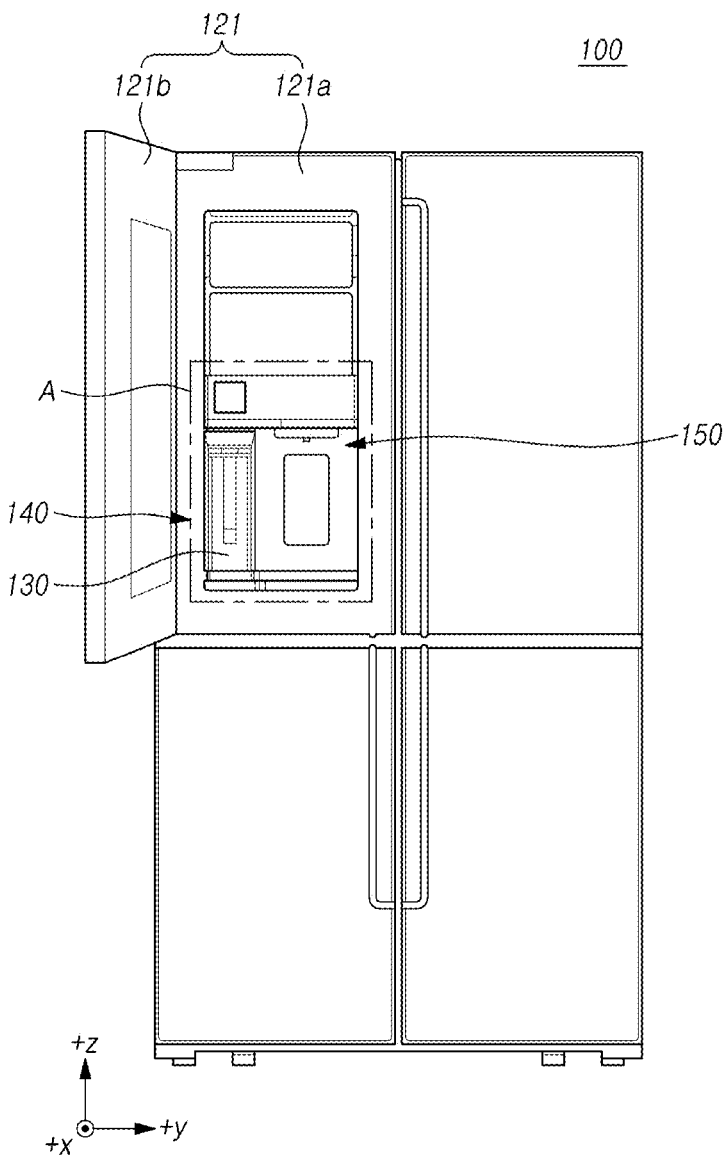
FIG. 2 is a view illustrating a refrigerator including a water supply device and a dispenser according to an embodiment of the disclosure.
Figure 3:
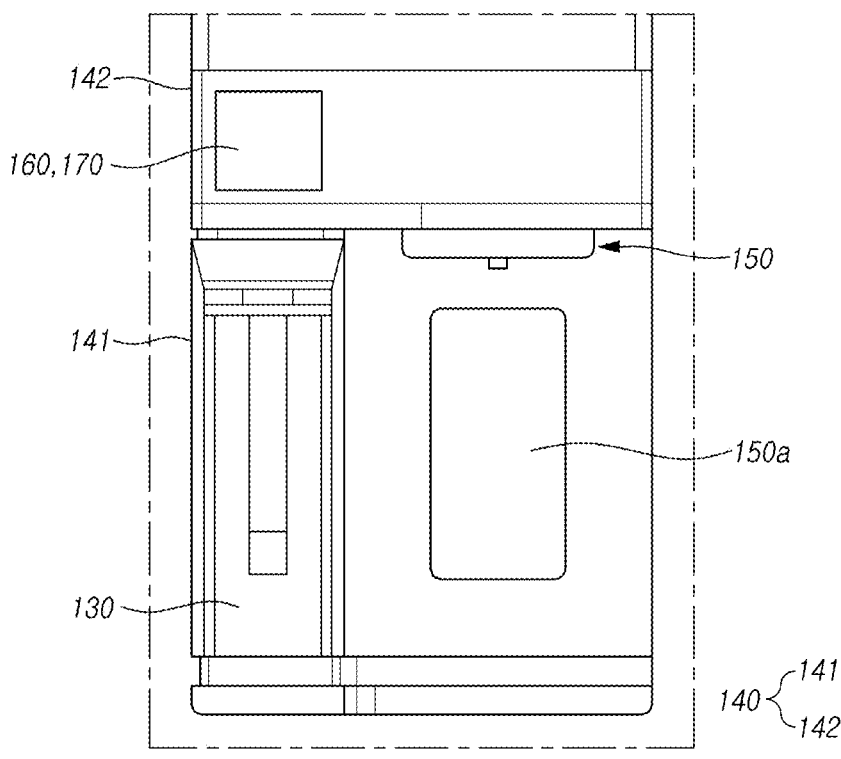
FIG. 3 is an enlarged view of portion A of FIG. 2 according to an embodiment of the disclosure.

FIG. 1 is a perspective view illustrating a refrigerator according to an embodiment of the disclosure. FIG. 2 is a view illustrating a refrigerator including a water supply device and a dispenser according to an embodiment of the disclosure. FIG. 3 is an enlarged view of portion A of FIG. 2.

Referring to FIGS. 1 to 3, a refrigerator 100 according to an embodiment of the disclosure may include a main body 110, a storage compartment (not shown) provided inside the main body 110, a door 120 opening and closing the storage compartment, a cold air supply device (not shown) supplying cold air to the storage compartment, and a water supply device 140 automatically supplying water to a water container 130 received in the refrigerator 100.

According to an embodiment, the main body 110 may have a hexahedral shape. According to an embodiment, the main body 110 may have an open front side. According to an embodiment, the main body 110 may include an inner case (not shown) forming a storage compartment, an outer case coupled to an outside of the inner case to form an outer appearance of the main body 110, and an insulator (not shown) provided between the inner case and the outer case to insulate the storage compartment.

According to an embodiment, the storage compartment may be divided into a plurality of areas by a partition wall (not shown) provided inside the main body 110. The storage compartment may be divided into, e.g., a freezing compartment, a refrigerating compartment, or an adjustable-temperature compartment according to a use and/or the temperature range. In an embodiment, a shelf and a storage container for storing food may be disposed inside the storage compartment.

According to an embodiment, the door 120 may be rotatably coupled to the main body 110. In an embodiment, the door 120 may be hinged to the front side of the main body. Here, the storage compartment may be opened and closed by rotation of the door 120. In an embodiment, a plurality of doors 121, 122, 123, and 124 may be provided to respectively correspond to the plurality of partitioned areas of the storage compartment.

According to an embodiment, the door 120 may include an inner door 121*a* rotatably coupled to the main body 110 and an outer door 121*b* rotatably coupled to the inner door 121*a*. The water supply device 140 and the dispenser 150 provided in the inner door 121*a*, to be described below, may be accessed without opening the storage compartment by simply rotating the outer door 121*b*.

According to an embodiment, the cold air supply device may be configured to set up a cooling cycle for compressing, condensing, expanding, and evaporating a refrigerant. The cold air supply device may generate cold air using the cooling cycle and supply the generated cold air to the storage compartment.

According to an embodiment, the water supply device 140 may be disposed in the inner door 121*a*. According to an embodiment, the water supply device 140 may include a water container mounting part 141 forming a space where the water container 130 is mounted (or coupled), a water supply cover 142 in which an input device 160 and/or a output device 170 is disposed, an optical sensor (143 of FIG. 4) configured to detect whether the water container 130 is coupled to the water supply device 140 and/or a water level of the water container 130 coupled to the water supply device 140, and a water supply valve (144 of FIG. 14) configured to adjust the water supply amount of the water container 130 coupled to the water supply device 140.

According to an embodiment, the optical sensor 143 may include a light emitting element (143*a* of FIG. 10) for radiating (or emitting) light such as infrared rays into the water supply device 140, and a light receiving element (143*b* of FIG. 10) for receiving light reflected from the water supply device 140. In an embodiment, the optical sensor 143 may correspond to a time of flight (ToF) type optical sensor.

According to an embodiment, the water supply valve 144 may be disposed inside the water supply cover 142. In an embodiment, the water supply valve 144 may be controlled to supply water to the water container 130 depending on whether the water container 130 is coupled to the water supply device 140. Further, the water supply valve 144 may be controlled to adjust the water supply amount based on the water level of the water container 130 coupled to the water supply device 140.

According to an embodiment, the refrigerator 100 may include an operation lever 150*a* and may further include the dispenser 150 supplying water by operating the operation lever 150*a*. In embodiment, the dispenser 150 may be disposed in the inner door 121*a*. In an embodiment, the dispenser 150 may be disposed adjacent to the water supply device 140. For example, the dispenser 150 may be disposed side-by-side with the water supply device 140, but the disclosure is not limited thereto, and different from illustration in FIG. 2, the dispenser 150 may be disposed perpendicular to the water supply device 140.

According to an embodiment, the input device 160 may be disposed in one area of the water supply cover 142, e.g., the water supply cover 142. The input device 160 may receive a command regarding the water supply device 140 such as the water supply amount (or water supply level) of the water container 130. The input device 160 may be implemented as a physical button, a touch panel, a microphone, or the like, and may receive a user command regarding the water supply device 140 in various ways.

According to an embodiment, the output device 170 may be disposed on one area of the water supply cover 142, e.g., the water supply cover 142. The output device 170 may be implemented as a display, a speaker, or the like and may provide information about the water supply device 140 in various ways. In an embodiment, the input device 160 and the output device 170 may be provided integrally with each other, but the disclosure is not limited thereto and may be provided as separate devices.

Figure 4:
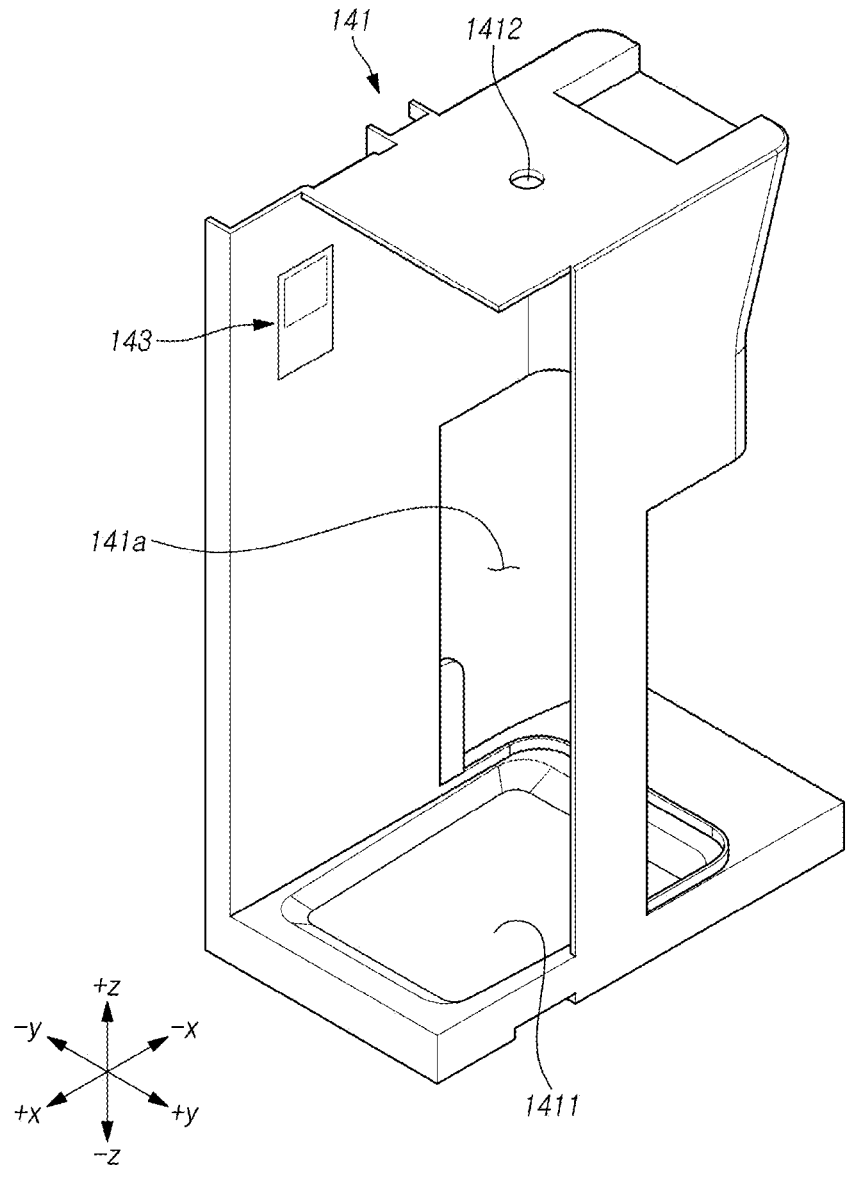
FIG. 4 is a perspective view illustrating a water container mounting part according to an embodiment of the disclosure.
Figure 5:
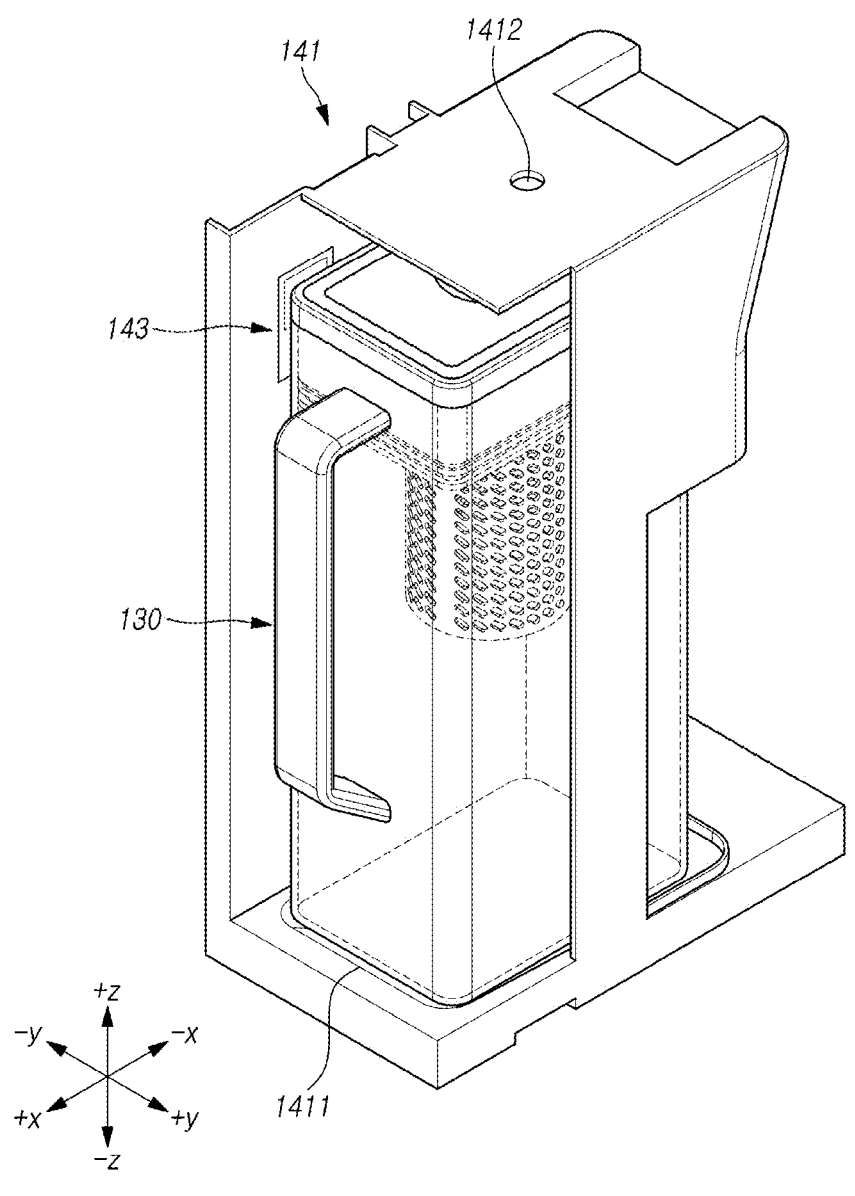
FIG. 5 is a perspective view illustrating a state in which a water container is coupled to a water container mounting part according to an embodiment of the disclosure.

FIG. 4 is a perspective view illustrating a water container mounting part according to an embodiment of the disclosure. FIG. 5 is a perspective view illustrating a state in which a water container is coupled to a water container mounting part according to an embodiment of the disclosure.

Referring to FIGS. 4 and 5, the water container mounting part 141 may form at least a portion (e.g., a lower portion) of an appearance of the water supply device 140.

According to an embodiment, the water container mounting part 141 may form a water container mounting space 141*a* in which the water container 130 is mounted. In an embodiment, an opening may be formed in a rear side of the water container mounting part 141. In an embodiment, the water container mounting space 141*a* may communicate with the storage compartment of the main body 110 through the opening of the water container mounting part 141. Here, as the cold air of the storage compartment is transferred to the water container 130 coupled to the water container mounting part 141, the water container 130 coupled to the water supply device 140 may be cooled.

According to an embodiment, a mounting groove 1411 for guiding mounting of the water container 130 may be formed in a bottom side of the water container mounting part 141. In an embodiment, the mounting groove 1411 may have a shape corresponding to a bottom side of the water container 130.

According to an embodiment, a water supply hole 1412, to which at least a portion of a water supply valve 144 of FIG. 14, to be described below, is fitted and coupled, may be formed in an upper side of the water container mounting part 141. Here, water may be supplied to the water container 130 coupled to the water supply device 140 through the water supply hole 1412.

According to an embodiment, the optical sensor 143 may be disposed on one side of the water container mounting part 141. In an embodiment, the optical sensor 143 may emit light toward a reflection mirror 180 of the water container 130, which is described below.

Figure 6:
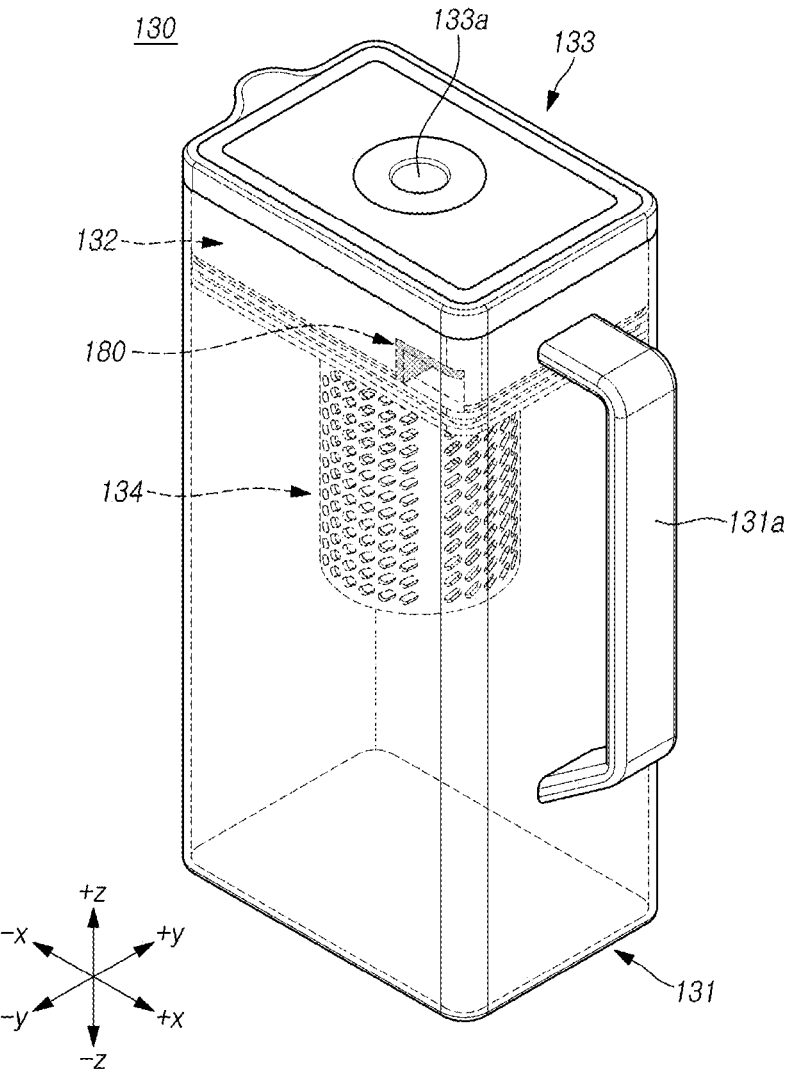
FIG. 6 is a perspective view illustrating a water container according to an embodiment of the disclosure.

FIG. 6 is a perspective view illustrating a water container according to an embodiment of the disclosure.

According to an embodiment, as illustrated in FIG. 5, the water container 130 may be detachably coupled to the water supply device 140, specifically, the water container mounting part 141.

Referring to FIG. 6, according to an embodiment, the water container 130 may include a water container main body 131 for storing water, an inner case 132 coupled to an upper portion of the water container main body 131, a water container cover 133 coupled to an upper portion of the inner case 132, and an infuser 134 capable of containing a tea bag and alike.

According to an embodiment, the water container main body 131 may store a predetermined amount of water. Maximum amount of water that may be stored in the water container main body 131 may be referred to as a full water storage amount. The maximum water storage amount may refer to a water storage amount if the height (or water level) of water stored in the water container main body 131 corresponds to a full water level (e.g., a height of 10 cm from the bottom side of the water container main body 131). In an embodiment, the water container main body 131 may be formed of a transparent material to readily check the water amount and/or water level stored therein. In an embodiment, a water container handle 131a may be provided on one side of the water container main body 131 to allow for easier grip of the water container 130.

According to an embodiment, the inner case 132 may be coupled to the water container main body 131 in a forced fitting manner. In an embodiment, the inner case 132 may include an infuser hole 1323 of FIG. 7 into which the infuser 134 is inserted. In an embodiment, the reflection mirror 180 for measuring the water level of the water container 130 may be disposed in the inner case 132.

According to an embodiment, the reflection mirror 180 may guide the light emitted from the optical sensor 143 to be reflected from the reflection mirror 180 and directed to the bottom side of the water container 130 or the water contained in the water container 130. According to an embodiment, the reflection mirror 180 may guide the light reflected from the bottom side of the water container 130 or a water surface of the water contained in the water container 130 to be reflected from the reflection mirror 180 and directed to the optical sensor 143. Hereinafter, the structure of the reflection mirror 180 is described below.

According to an embodiment, the water container cover 133 may include an inlet 133a through which water is introduced into the water container main body 131. If the water container 130 is coupled to the water supply device 140, the inlet 133a may be positioned to face the water supply hole 1412 of FIG. 5 of the water container mounting part 141.

According to an embodiment, the infuser 134 may have a cylindrical shape. In an embodiment, the infuser 134 may be provided with a plurality of through holes to allow water to pass into inside of the tea bag.

Figure 7:
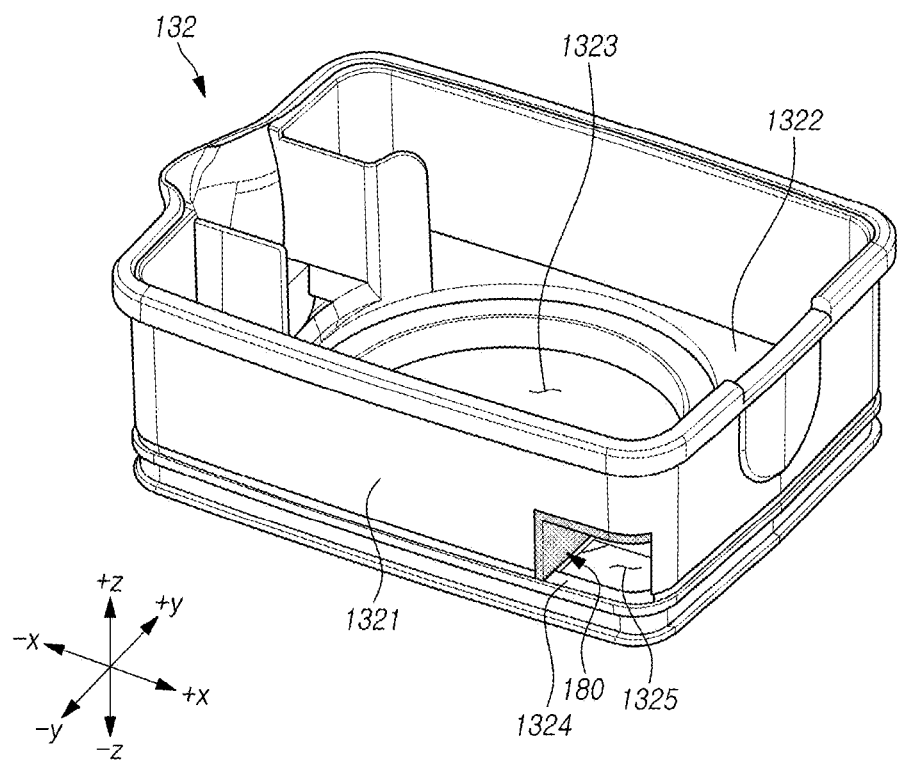
FIG. 7 is a perspective view illustrating an inner case of a water container according to an embodiment of the disclosure.
Figure 8:
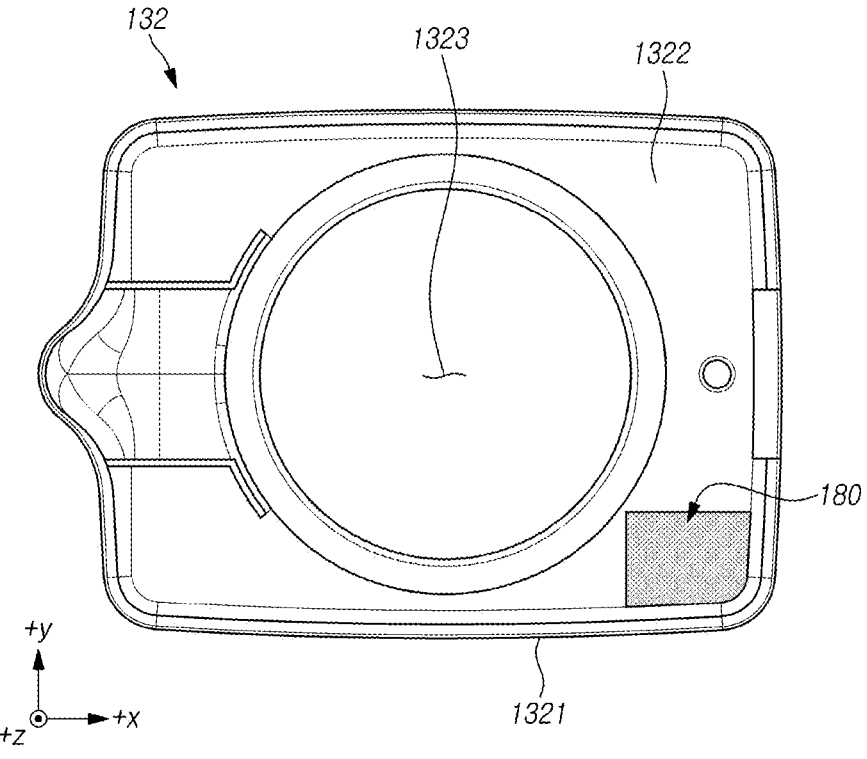
FIG. 8 is a plan view illustrating an inner case of a water container according to an embodiment of the disclosure.

FIG. 7 is a perspective view illustrating an inner case of a water container according to an embodiment of the disclosure. FIG. 8 is a plan view illustrating an inner case of a water container according to an embodiment of the disclosure.

Referring to FIGS. 7 and 8, a first opening 1324 may be provided on a surface of a side 1321 of the inner case 132 according to an embodiment. In an embodiment, the first opening 1324 may be positioned at an edge (or a corner portion) of the surface of the side 1321.

According to an embodiment, a second opening 1325 may be provided in a bottom side 1322 of the inner case 132. In an embodiment, the second opening 1325 may be positioned adjacent to the first opening 1324. In an embodiment, the second opening 1325 may be positioned at an edge (or corner portion) of the bottom surface 1322.

According to an embodiment, the reflection mirror 180 may be connected to each of the first opening 1324 and the second opening 1325 of the inner case 132. The light emitted from the optical sensor 143 or the light reflected from the inside of the water container 130 may be moved inside and outside the water container 130 by the reflection mirror 180 and the openings 1324 and 1325.

According to an embodiment, the reflection mirror 180 may be positioned to face the optical sensor 143. In an embodiment, when the inner case 132 is viewed from above, the reflection mirror 180 may be disposed adjacent to any one of four corner portions of the bottom side 1322 of the inner case 132. The optical sensor 143 and the openings 1324 and 1325 of the inner case 132 may be disposed at positions corresponding to the reflection mirror 180.

According to an embodiment, the reflection mirror 180 may be positioned at a position having the least amount of curvature (e.g., maximally flat) on the surface of the side 1321 and the bottom side 1322 of the inner case 132 and may be positioned close to a central portion of the inner case 132 so that the light emitted from the optical sensor 143 may be maximally incident on the water surface of the water stored in the water container 130. Here, a refractive loss of light generated in a curved portion of the water container 130 may be compensated.

Figure 9:
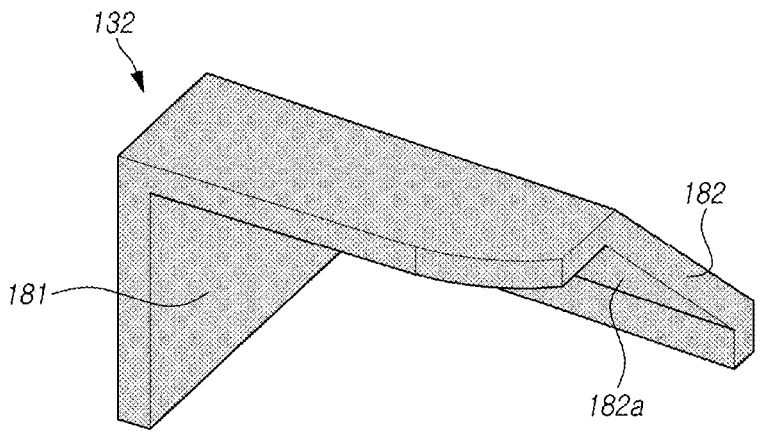
FIG. 9 is a perspective view illustrating a reflection mirror according to an embodiment of the disclosure.

FIG. 9 is a perspective view illustrating a reflection mirror according to an embodiment of the disclosure.

Referring to FIG. 9, the reflection mirror 180 according to an embodiment may include a sidewall 181 forming one surface of a side of the reflection mirror 180 and an upper wall 182 having a reflection surface 182a. However, the disclosure is not limited thereto, and the reflection mirror 180 may be configured only with the upper wall 182 having the reflection surface 182a without the sidewall 181. Here, the reflection surface 182a may refer to an inner surface of the upper wall 182 facing at least part of the openings 1324 and 1325.

According to an embodiment, the reflection surface 182a of the reflection mirror 180 may be processed to reflect as much light as possible. For example, a high-reflectivity metal such as chromium (Cr), silver (Ag), or aluminum (Al) may be plated on a surface of the reflection surface 182a. For example, a silver glossy spray may be applied to the surface of the reflection surface 182a. For example, the reflection surface 182a may be injection-molded with a silver glossy material. The disclosure is not limited to the above-described processing method, and various processing methods for increasing reflectance of the reflection surface 182a may be applied.

Figure 10:
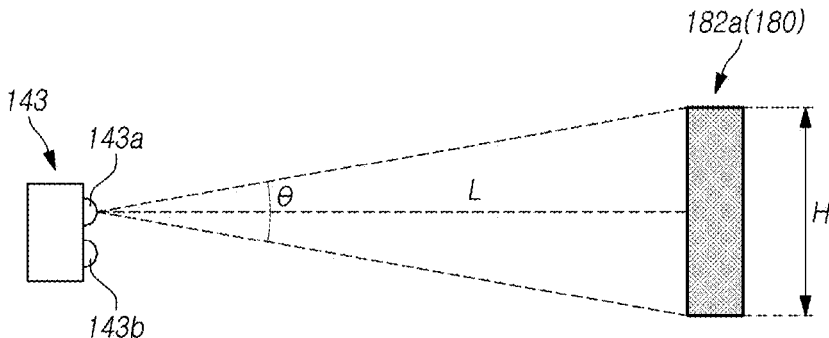
FIG. 10 is a view schematically illustrating a size relationship between an angle of view of an optical sensor and a reflection surface of a reflection mirror according to an embodiment of the disclosure.

FIG. 10 is a schematic view illustrating a size relationship between an angle of view of an optical sensor and a reflection surface of a reflection mirror according to an embodiment of the disclosure.

Referring to FIG. 10, the size (or height) H of the reflection surface 182a of the reflection mirror 180 according to an embodiment may be designed to cover the angle of view (or divergence angle) θ of light emitted from the optical sensor 143.

According to an embodiment, the size (or height) H of the reflection surface 182a of the reflection mirror 180 may be designed to meet Equation 1 below.

$$H = 2L * \tan(\theta/2) \qquad \text{[Equation 1]}$$

(where, H is the size (or height) of the reflection surface 182a, L is the distance from the optical sensor 143 to the reflection surface 182a, and θ is the angle of view of the optical sensor 143.)

Figure 11:
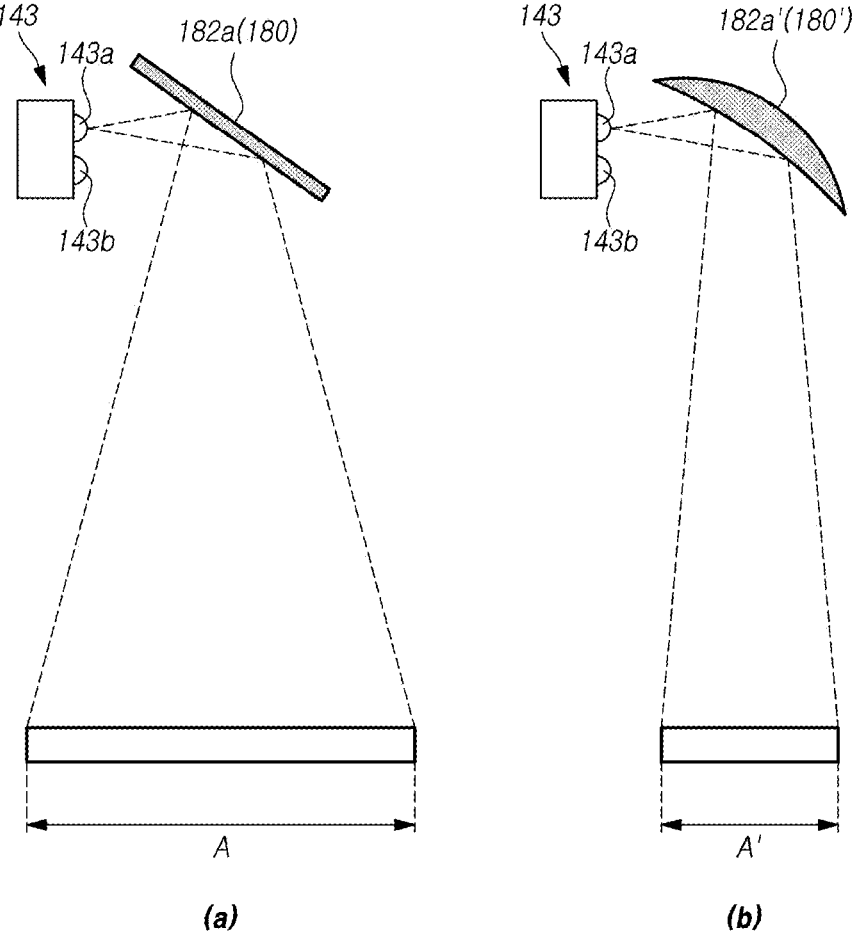
FIG. 11 is a view schematically illustrating various shapes of a reflection surface of a reflection mirror according to an embodiment of the disclosure.

FIG. 11 is a view schematically illustrating various shapes of a reflection surface of a reflection mirror according to an embodiment of the disclosure.

Specifically, (a) of FIG. 11 illustrates a condensing area A if the reflection surface 182a has a flat shape, and (b) of FIG. 11 illustrates a condensing area A' when the reflection surface 182a' has a curved shape.

In (a) of FIG. 11, the reflection surface 182a of the reflection mirror 180 according to an embodiment may be provided to have a flat shape. In (b) of FIG. 11, the reflection surface 182a' of the reflection mirror 180' according to an embodiment may be provided to have a concave shape, unlike that illustrated in FIG. 11A.

Comparing (a) and (b) of FIG. 11, it may be identified that the condensing area A' when the reflection surface 182a' is formed as the curved surface is narrower than the condensing area A when the reflection surface 182a is formed as the flat surface (the area is reduced by 75% compared to (a) of FIG. 11). As described above, if the reflection surface 182a' is formed of the concave surface, the reflection mirror 180' may further condense the light reflected from the reflection surface 182' to increase the amount of light incident on the water surface (the amount of incident light is increased by 1.9 times compared to (a) of FIG. 11). If the reflection mirror 180 is positioned at the edge of the water container 130, the performance of the light sensor 143 may be enhanced by reducing the amount of incident light due to light leaking out of the water container 130 and light refracted by the infuser 134 of the water container 130.

Figure 12:
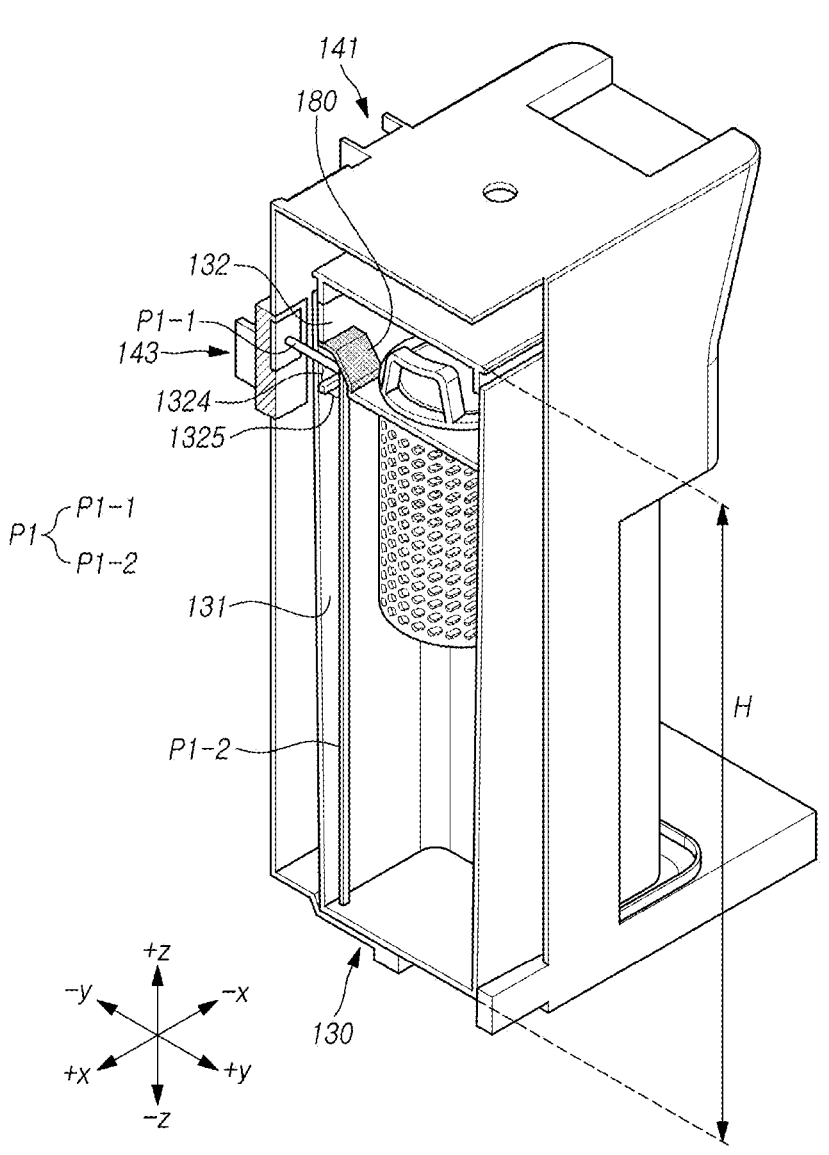
FIG. 12 is a cross-sectional view illustrating a water container coupled to a water container mounting part according to an embodiment of the disclosure.
Figure 13:
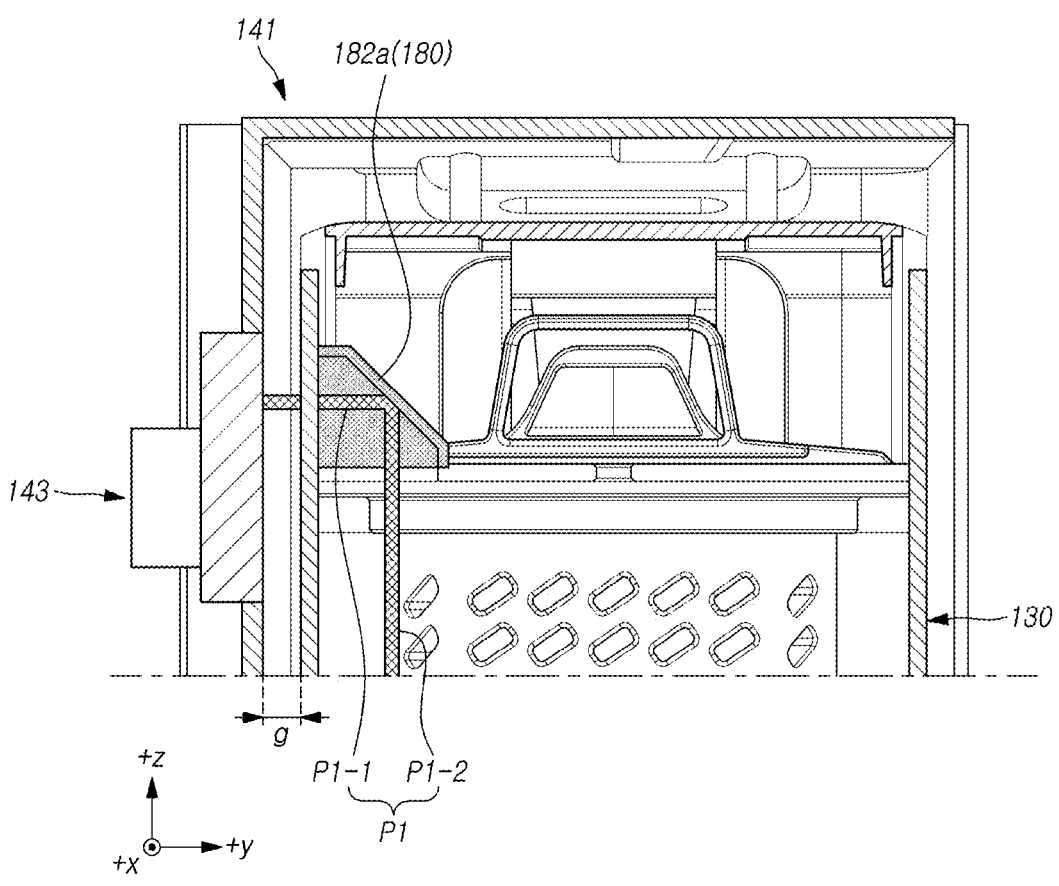
FIG. 13 is an enlarged view illustrating a portion of a cross section of a water container coupled to a water container mounting part according to an embodiment of the disclosure.

FIG. 12 is a cross-sectional view illustrating a water container coupled to a water container mounting part according to an embodiment of the disclosure. FIG. 13 is an enlarged view illustrating a portion of a cross section of a water container coupled to a water container mounting part according to an embodiment of the disclosure.

Hereinafter, referring to FIGS. 12 and 13, when the water container 130 is coupled to the water container mounting part 141, a traveling path P1 of light emitted from the optical sensor 143 is described.

Referring to FIGS. 12 and 13, the light emitted from the optical sensor 143 may pass through the water container main body 131 formed of a transparent material and then pass through the first opening 1324 provided in the inner case 132 to reflect off the reflection surface 182a of the reflection mirror 180. The light emitted to the optical sensor 143 may travel along an optical path P1-1 extending substantially horizontally.

Thereafter, the light reflected off the reflection surface 182a may be redirected to face the bottom side of the water container 130 or the surface of the water stored in the water container 130. The light reflected from the reflection surface 182a may travel along an optical path P1-2 extending substantially perpendicular to the optical path P1-1.

Thereafter, the light reflected from the bottom side of the water container 130 or the surface of the water stored in the water container 130 may proceed in a direction opposite to the above-described optical paths P1-1 and P1-2 and received by the optical sensor 143. As such, the reflection surface 182a of the reflection mirror 180 may have a predetermined angle to reflect the light emitted from the optical sensor 143 to the bottom side of the water container 130 and to reflect the light, reflected from the bottom side of the water container 130 or the water surface of the water, back to the optical sensor 143. For example, the reflection surface 182a of the reflection mirror 180 may be provided to have an angle of 45 degrees with respect to each of the first opening 1324 and the second opening 1325.

The refrigerator 100 may calculate a traveling distance of the light emitted by the optical sensor 143 using a time value between a light emission time and a light reception time of the light from the optical sensor 143 and measure the water level of the water stored in the water container 130 using the calculated traveling distance of the light.

The traveling distance of the light may be calculated using Equation 2 below.

$$d = c * t \qquad \text{[Equation 2]}$$

(where, d is the traveling distance of light, c is the constant at the speed of light, and t means the time value between a light emission time and the light reception time of light in the optical sensor 143.)

The water level h of the water stored in the water container 130 may be calculated using Equation 3 below.

$$h = H - k * (c * t/2) \qquad \text{[Equation 3]}$$

(where, h is the water level of the water stored in the water container 130, H is a height of the water container 130, k is a proportional constant for offsetting an error according to the horizontal traveling distance of light, c is a constant which is the speed of light, and t means the time between the light emission time and the light reception time in the light sensor 143.)

Figure 14:
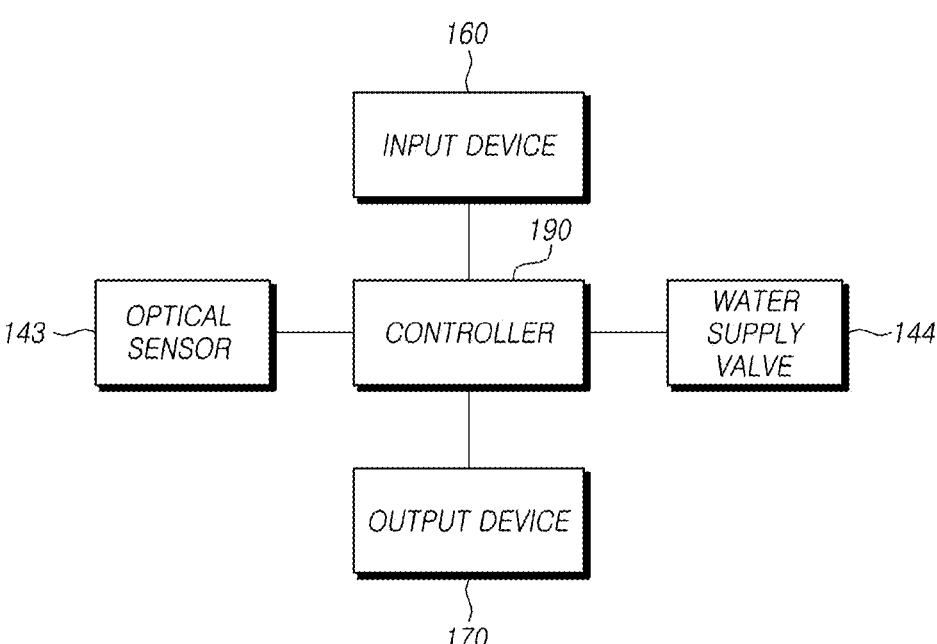
FIG. 14 is a control block diagram illustrating a refrigerator according to an embodiment of the disclosure.

FIG. 14 is a control block diagram illustrating a refrigerator according to an embodiment of the disclosure.

Referring to FIG. 14, the refrigerator 100 according to an embodiment of the disclosure may include a controller 190 adjusting the water supply valve 144 based on whether the water container is coupled and a sensing value of the optical sensor 143 sensing (or detecting) the water level of the water container. In an embodiment, the controller 190 may adjust the water supply valve 144 to automatically supply water to the water container 130 based on the water level of the water container detected by the optical sensor 143. In an embodiment, the controller 190 may adjust the water supply valve 144 to supply water to the water container 130 based on the user's command regarding water supply (e.g., water supply level) through the input device 160. In an embodiment, the controller 190 may provide information about whether the water container is coupled and/or the water level of the water container detected by the optical sensor 143 through the output device 170.

Figure 15A:
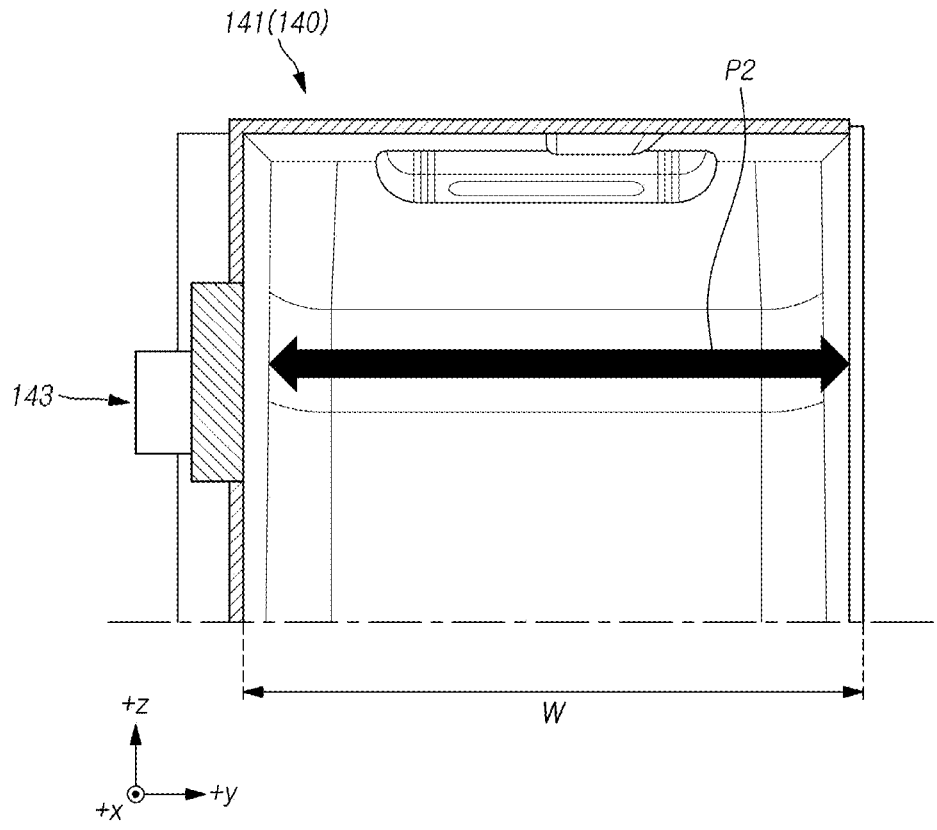
FIG. 15A is a view illustrating a path of light in a state in which a water container is not coupled to a water supply device according to an embodiment of the disclosure.
Figure 15B:
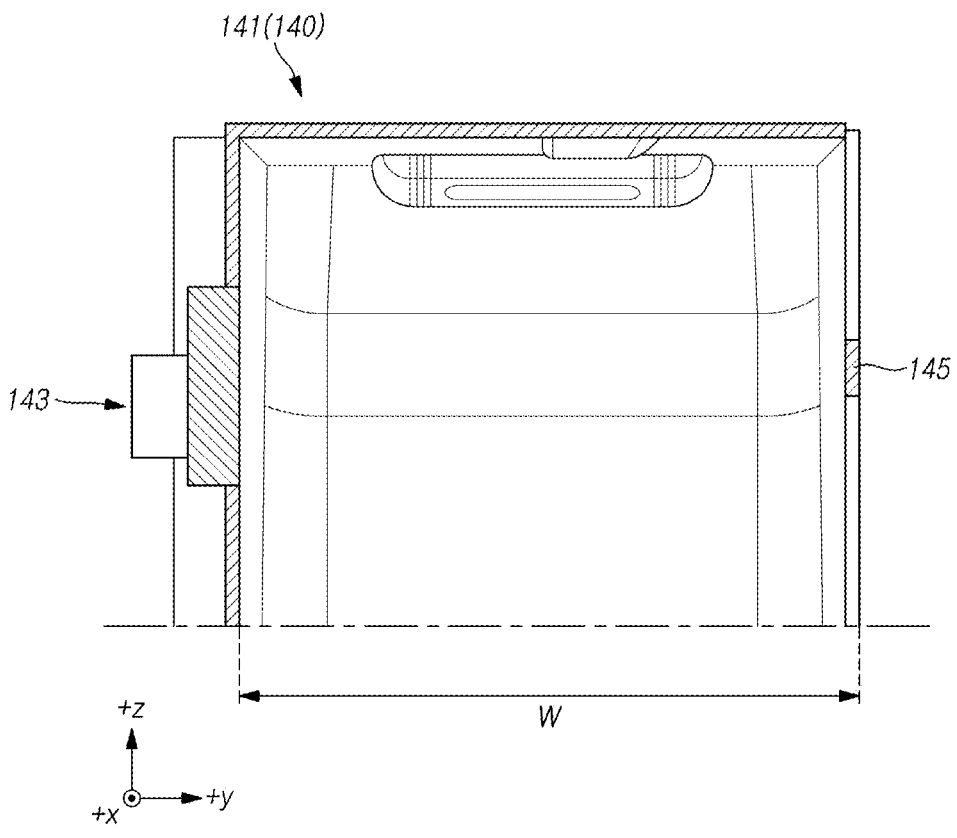
FIG. 15B is a view illustrating a path of light in a state in which a water container is not coupled to a water container according to an embodiment of the disclosure.
Figure 16:
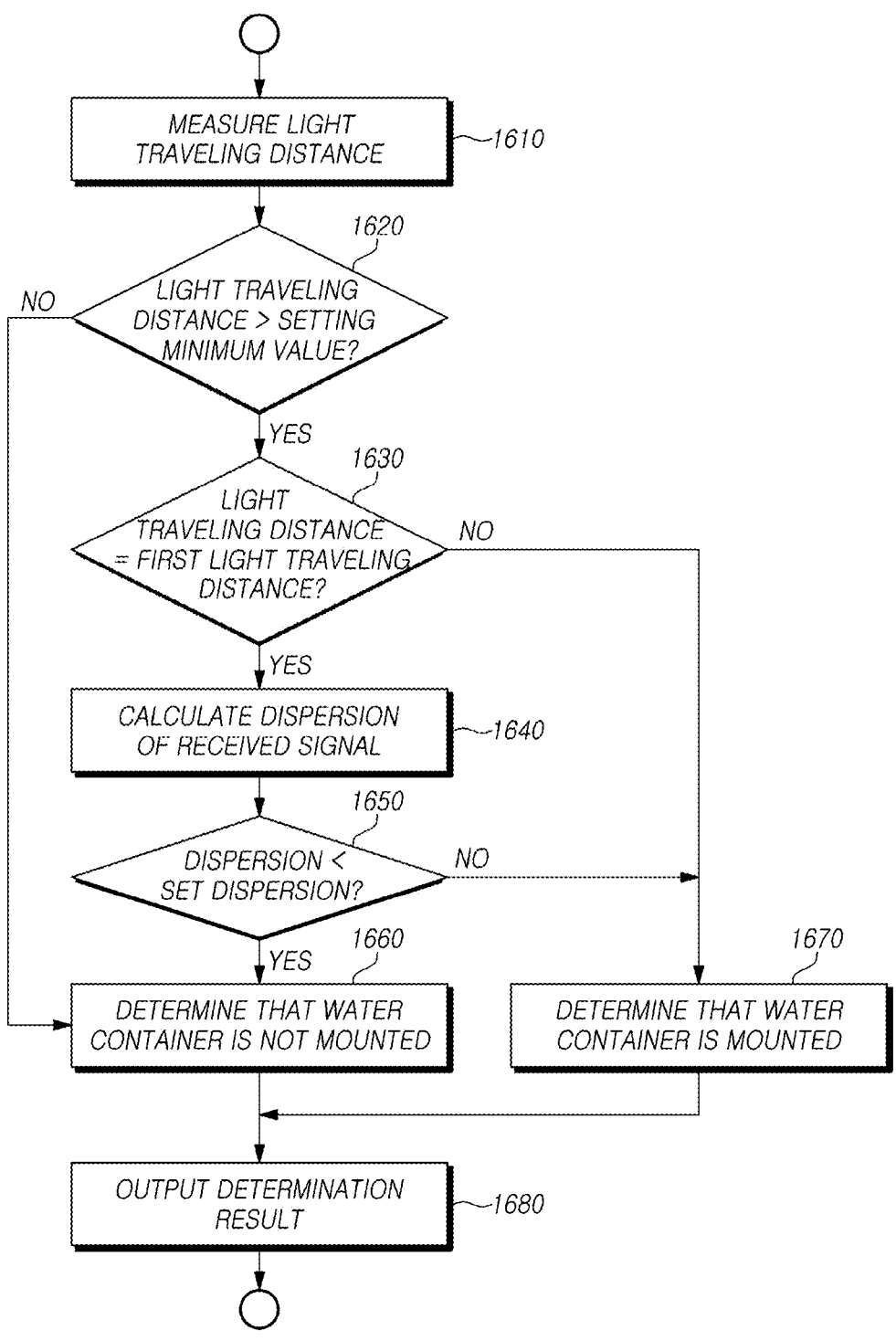
FIG. 16 is a control flowchart illustrating a refrigerator according to an embodiment of the disclosure.

FIG. 15A is a view illustrating path of light in a state in which a water container is not coupled to a water supply device according to an embodiment of the disclosure. FIG. 15B is a view illustrating a path of light in a state in which a water container is not coupled to a water container according to an embodiment of the disclosure. FIG. 16 is a control flowchart illustrating a refrigerator according to an embodiment of the disclosure.

FIG. 15A is a view illustrating when the water container 130 is not coupled to the water supply device 140 and illustrates a traveling path P2 of light emitted from the optical sensor 143. FIG. 15B is a view illustrating a state in which the water container 130 is not coupled to the water supply device 140 provided with an anti-reflection structure 145.

Hereinafter, a method for determining whether the water container 130 is coupled to the water supply device 140 is described with reference to FIGS. 15A, 15B and 16.

Referring to FIGS. 15A, 15B and 16, in an embodiment, any one of the anti-reflection structure 145, a diffuse-reflection structure, a hole, and an inclined structure may be disposed on the other side surface facing the one side surface of the water container mounting part 141 on which the optical sensor 143 is disposed. In an embodiment, any one of the anti-reflection structure 145, the diffuse-reflection structure, the hole, and the inclined structure may be positioned to face the optical sensor 143. The anti-reflection structure 145 may be implemented in a form of, e.g., an anti-reflection film or an anti-reflection coating that absorbs light emitted from the optical sensor 143 (see FIG. 15B). The diffuse-reflection structure may be implemented, e.g., in a form of a pattern such as irregularities that diffusely reflect light emitted from the optical sensor 143. The hole may be configured to allow light emitted from the optical sensor 143 to pass therethrough. The inclined structure may be configured so that light emitted from the optical sensor 143 is reflected in another direction not facing the optical sensor 143.

The refrigerator 100 according to an embodiment of the disclosure may be configured to use the optical sensor 143 to measure the traveling distance of light emitted from optical sensor 143 (1610). The traveling distance of the light may be measured using Equation 2 described above.

In an embodiment, if any one of the anti-reflection structure 145, the diffuse-reflection structure, the hole, and the inclined structure described above is disposed in the water supply device 140 (specifically, the water container mounting part 141) (see FIG. 15B), the refrigerator 100 may be configured to determine whether the light traveling distance measured in operation 1610 is equal to or larger than a predefined minimum value (1620). Here, the predefined minimum value may refer to a predetermined value as a minimum value among light traveling distances measured by the optical sensor 143 for a predetermined time in a state in which the water container 130 in the water supply device 140 is not coupled. Alternatively, the refrigerator 100 may determine whether the amount of light received by the optical sensor 143 is larger than or equal to the predefined minimum value. This is because when a structure such as the anti-reflection structure 145 is provided, the amount of light emitted from the optical sensor 143 and absorbed or scattered by the structure and then received by the optical sensor 143 reduces.

In an embodiment, if any one of the above-described anti-reflection structure, diffuse-reflection structure, hole, and inclined structure is not disposed on the water container mounting part 141 (see FIG. 15A), the refrigerator 100 may proceed from operation 1610 to operation 1630 bypassing operation 1620.

In an embodiment, if the measured light traveling distance is smaller than the predefined minimum value (No in 1620), the refrigerator 100 may be configured to determine that the water container 130 is not coupled to the water supply device 140 (1660).

In an embodiment, if the measured light traveling distance is equal to or larger than the predefined minimum value (Yes in 1620), the refrigerator 100 may be configured to determine whether the measured light traveling distance is substantially the same as a first light traveling distance (1630). Here, the first light traveling distance may indicate a value corresponding to about twice the width W of the water container mounting part 141 illustrated in FIGS. 15A and 15B.

In an embodiment, if the measured light traveling distance is not substantially the same as the first light traveling distance (No in 1630), the refrigerator 100 may be configured to determine that the water container 130 is coupled to the water supply device 140 (1670).

In an embodiment, if the measured light traveling distance is substantially the same as the first light traveling distance (Yes in 1630), the refrigerator 100 may be configured to calculate a dispersion of the measured light traveling distance (1640).

The dispersion of the measured light traveling distance may be calculated using Equation 4 below.

$$m = \frac{1}{N} \sum_{i=1}^{N} (t_i - \mu)^2 \qquad \text{[Equation 4]}$$

(Here, m is the dispersion of the light traveling distance, t is the time value between the light emission time and the light reception time of light in the optical sensor 143, and μ is, as $$\mu = \frac{1}{N} \sum_{i=1}^{N} t_i,$$

an average of N time values measured for a predetermined time.)

In an embodiment, the refrigerator 100 may be configured to determine whether the dispersion m calculated in operation 1640 is smaller than a predetermined dispersion M (1650). The predetermined dispersion M is a value determined in consideration that the dispersion of the light traveling distance measured when the water container 130 is not coupled to the water supply device 140 is not larger than the dispersion of the light traveling distance measured when the water container 130 is coupled to the water supply device 140, and may correspond to, e.g., 0.3.

The reason for considering the dispersion in each case as described above is that even when the light traveling distance, measured when the water container 130 is not coupled to the water supply device 140 and the light traveling distance measured when the water container 130 is coupled to the water supply device 140, are substantially the same, the dispersion of the light signal reflected from the surface of the water varies as the water stored in the water container 130 remains unsteady (e.g., shakes).

Even when the light traveling distances are substantially the same, the refrigerator 100 may more accurately determine whether the water container 130 is coupled to the water supply device 140 by considering the dispersion of the light traveling distances in each case.

In an embodiment, if the calculated dispersion m is smaller than the predetermined dispersion M (Yes in 1650), the refrigerator may be configured to determine that the water container 130 is not coupled to the water supply device 140 (1660).

In an embodiment, if the calculated dispersion m is larger than or equal to the set dispersion M (No in 1650), the refrigerator may be configured to determine that the water container 130 is coupled to the water supply device 140 (1670).

In an embodiment, the refrigerator 100 may be configured to provide the results 1660 and 1670 of determining whether the water container 130 is coupled through the output device 170 (1680).

Figure 17:
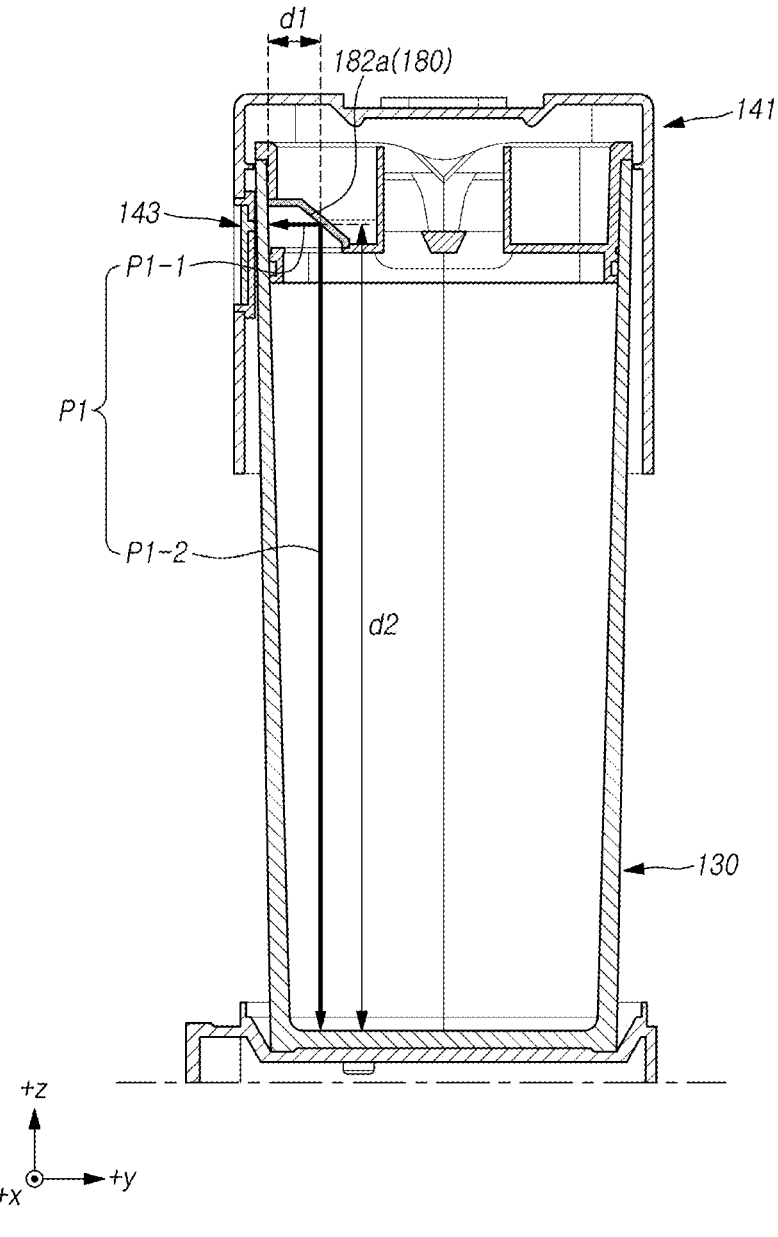
FIG. 17 is a view illustrating a path of light in a state in which a water container is coupled to a water supply device according to an embodiment of the disclosure.
Figure 18:
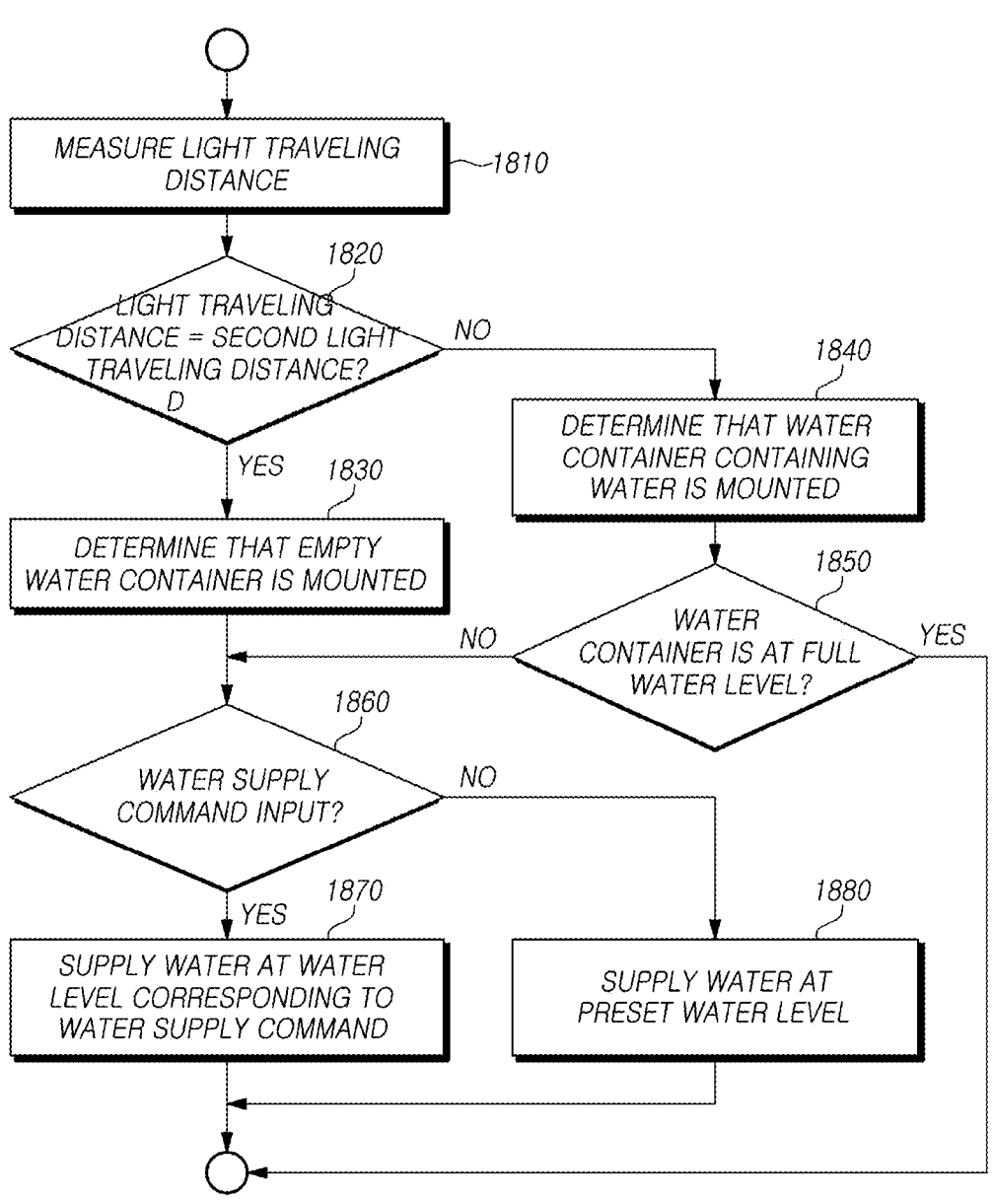
FIG. 18 is a control flowchart illustrating a refrigerator according to an embodiment of the disclosure.

FIG. 17 is a view illustrating a path of light in a state in which a water container is coupled to a water supply device according to an embodiment of the disclosure. FIG. 18 is a control flowchart illustrating a refrigerator according to an embodiment of the disclosure.

FIG. 17 is a view illustrating the traveling path P1 of light emitted or received by the optical sensor 143 when the water container 130 is coupled to the water supply device 140.

Hereinafter, a method for measuring the water level of the water container 130 and a method for supplying the water container 130 when the water container 130 is coupled to the water supply device 140 are described with reference to FIGS. 17 and 18.

Referring to FIGS. 17 and 18, the refrigerator 100 according to an embodiment of the disclosure may be configured to use the optical sensor 143 to measure the traveling distance of light emitted from the optical sensor 143 (1810). The traveling distance of the light may be measured using Equation 2 described above.

In an embodiment, the refrigerator 100 may be configured to determine whether the measured traveling distance of light is substantially the same as a second light traveling distance (1820). Here, the second light traveling distance may indicate a value corresponding to about twice the total sum of the traveling distances d1 and d2 corresponding to the optical paths P1-1 and P1-2 in the state in which the water container 130 is coupled.

In an embodiment, if the measured light traveling distance is substantially the same as the second light traveling distance (Yes in 1820), the refrigerator 100 may be configured to determine that the empty water container 130 is coupled to the water supply device 140 (1830).

In an embodiment, the refrigerator 100 may be configured to determine whether a water supply level (or a water supply amount) is inputted to the input device 160 by the user (1860). For example, if a command regarding water supply is not inputted to the input device 160 within a predefined waiting time after the determination in operation 1830 or 1850, the refrigerator 100 may determine that there is no user command regarding the water supply level. Here, the water supply level may mean or associated with the water level of the water container 130 targeted by the user.

In an embodiment, if the water supply level is inputted to the input device 160 (Yes in 1860), the refrigerator 100 may be configured to adjust the water supply valve 144 to reach the water supply level corresponding to the user command.

In an embodiment, if the water supply level is not inputted to the input device 160 (Yes in 1860), the refrigerator 100 may be configured to adjust the water supply valve 144 to reach a predefined water supply level to supply water. Here, the predefined water supply level may mean or indicate, e.g., the water supply level mainly inputted by the user, the water supply level last input, or the like, but the disclosure is not limited thereto.

In an embodiment, if the measured light traveling distance is not substantially the same as the second light traveling distance (No in 1820), the refrigerator 100 may be configured to determine that the water container 130 containing water, i.e., not empty, is coupled to the water supply device 140 (1840).

In an embodiment, if the water container 130 containing water is coupled to the water supply device 140, the refrigerator 100 may be configured to determine whether the water level of the water container 130 is the full water level (1850). The water level of the water container 130 may be measured using Equation 3 described above.

In an embodiment, if the water level of the water container 130 is not the full water level (No in 1850), the refrigerator 100 may perform operation 1860 and a subsequent operation 1870 or 1880 according to the determination result in operation 1860.

In an embodiment, if the water level of the water container 130 is the full water level (Yes in 1850), the refrigerator may not perform a separate operation.

FIG. 19A is a view illustrating a screen regarding a water supply setting (or configuration) displayed on an input/output device according to an embodiment of the disclosure. FIG. 19B is a view illustrating a screen regarding a water level setting (or configuration) of a water container shown on an input/output device during water supply according to an embodiment of the disclosure. FIG. 19C is a view illustrating a screen regarding a progress (or status) of water supply shown on an input/output device during water supply according to an embodiment of the disclosure.

Specifically, FIG. 19B illustrates an example in which an empty water container (e.g., the water container 130 of FIG. 2) is coupled to a water supply device (e.g., the water supply device 140 of FIG. 2).

FIGS. 19A to 19C illustrate an output screen of the output device 170 for a water supply command when the input device (e.g., the input device 160 of FIG. 2) and the output device (e.g., the output device 170 of FIG. 2) are implemented as one device (e.g., a touch panel). Hereinafter, for convenience of description, the input device 160 and the output device 170 will be collectively referred to as an input/output device 1900.

Referring to FIG. 19A, a water supply capacity menu 1901, for setting a water supply capacity supplied to the water container (e.g., the water container 130 of FIG. 2), a speech recognition menu 1902 for setting a speech recognition for the water supply capacity, and a user-customized menu 1903 for setting the water supply capacity, may be outputted to the input/output device 1900.

In an embodiment, the water level (or water supply height and water supply capacity) of the water container 130 may be selected on the water supply capacity menu 1901 displayed or shown on the input/output device 1900.

In an embodiment, the speech recognition function of the refrigerator (e.g., the refrigerator 100 of FIG. 1) may be activated (e.g., turned on) or deactivated (e.g., turned off) by selecting (or touching) the speech recognition menu 1902 displayed on the input/output device 1900.

In an embodiment, the user setting regarding the water level (or water supply height and water supply capacity) of the water container 130 may be changed by selecting (or touching) the user-customized menu 1903 displayed on the input/output device 1900. For example, the user may set or configure the water level of the water container 130 (hereinafter, referred to as an automatic water supply level) at the time of automatic water supply in the user-customized menu 1903. For example, the user may activate (on) or deactivate (off) the automatic water supply function in the user-customized menu 1903. The automatic water supply function may refer to a function of automatically supplying water to the water container 130 without a separate command from the user when the empty water container or the water container 130 having a water level lower than the automatic water supply level is detected.

Referring to FIG. 19B, a current water level of the water container 130 coupled to the water supply device 140 may be displayed on the screen of the input/output device 1900 (1910). As illustrated in FIG. 19B, the current water level of the water container 130 is 0, and the water container 130 is empty.

The text "Please select the water level" may be displayed on an upper end 1904 of the screen of the input/output device 1900. Icons 1911, 1912, and 1913 regarding the target water supply level (or target water level) of the water container 130 may be displayed on the lower end 1910 of the screen of the input/output device 1900, together with the current water level of the water container 130. Each of the icons 1911, 1912, and 1913 may be positioned at a point corresponding to the water level of the water container 130. For example, the icons 1911, 1912, and 1913 may be sequentially positioned at water levels corresponding to upper/middle/lower levels of the water container 130.

Any one of icons 1911, 1912, and 1913 regarding target water supply level displayed on the screen of the input/output device 1900 may be touched (or selected) 1920. The water supply valve 144 may be adjusted in response to the touch command (or water supply level command) to start the water supply of the water container 130.

Referring to FIG. 19C, if the water supply of the water container 130 starts, the current water level of the water container 130 may be displayed, in real time, on the screens 1910*a*, 1910*b*, and 1910*c* of the input/output device 1900. For example, the water level of the water container 130 that gradually rises as water supply to the water container 130 starts may be displayed or shown in the form of an upper/middle/lower levels. Specifically, as illustrated in FIG. 19B, if a target water supply level corresponding to the upper, middle, and lower water levels of the water container 130 is touched (or selected) (1920), a rising water level of the empty water container 130 may be display on the screen 1910 of the input/output device 1900 in the shaded form in the order of the lower (1930), the middle (1940), and the upper (1950) (sequentially illustrated in (a) to (c) of FIG. 19C).

Thereafter, if the water level of the water container 130 reaches the target water supply level corresponding to the user command, water supply completion message or indicator may be displayed on the screen 1910 of the input/output device. For example, a text such as "water supply is completed" may be displayed on the upper end 1904 of the screen of the input/output device 1900. For example, at the lower end 1910 of the screen of the input/output device 1900, the current water level of the water container 130 corresponding to the target water supply level may be shown in the form of an image.

However, in the disclosure, the target water supply level is not limited to the water level of the upper/middle/lower water container, and in some embodiments, the water supply to the water container 130 may be started and terminated at the water level corresponding to a touch point designated or specified by the user.

In an embodiment, although not specifically illustrated in the drawings, if the input/output device 1900 further includes components (e.g., a microphone and a speaker) for speech recognition of the user, the refrigerator 100 may recognize a speech command (e.g., "Fill only half of the water container") of the user regarding the target water supply level through the input/output device (e.g., the microphone). For example, as described above, if the speech recognition function is activated in the input/output device 1900, the water supply valve 144 may be adjusted in response to the user's speech command to start the water supply of the water container 130. Thereafter, if the water level of the water container 130 reaches the target water supply level corresponding to the speech command of the user, a notification (e.g., water supply completion text or sound) for water supply completion may be output to the input/output device (e.g., speaker).

In an embodiment, although not specifically shown in the drawings, if the automatic water supply function is activated in the input/output device 1900 as described above and if an empty water container is detected and a user command for water supply is not input to the input/output device 1900 for a predetermined time, the refrigerator 100 may supply water to the water container 130 at the target water supply level previously input to the input/output device 1900. Alternatively, the water container 130 may be supplied water at the target water supply level predefined on the user-customized menu 1903. If the water level of the water container 130 reaches the target water supply level, the water supply completion notification (e.g., water supply completion text or sound) may be provided to the user through the input/output device 1900.

FIG. 20 is a cross-sectional view illustrating a water container coupled to a water container mounting part according to an embodiment of the disclosure. FIG. 21 is an enlarged view illustrating a portion of a cross section of a water container coupled to a water container mounting part according to an embodiment of the disclosure.

FIGS. 20 and 21 are views illustrating a method for determining whether the water container 230 without the reflection mirror 180 is coupled and a method for measuring the water level of the water container.

Referring to FIGS. 20 and 21, the refrigerator according to an embodiment may include a water container 230, and a water supply device 240 including a water container mounting part 241 and an optical sensor 243. The water container 230 and the water supply device 240 illustrated in FIGS. 20 and 21 may be substantially the same in function, shape, and/or structure as the water container 130 and the water supply device 140, respectively, illustrated in FIGS. 4 to 6. Hereinafter, for convenience of description, only parts having differences between respective components are described.

According to an embodiment, the optical sensor 243 may be disposed on the upper side of the water container mounting part 241.

According to an embodiment, the water container 230 may include a water container main body 231, an inner case 232, and a water container cover 233.

According to an embodiment, a transparent panel 233*b* may be disposed on the upper side of the water container cover 233. In an embodiment, the transparent panel 233*b* may be positioned to face the optical sensor 243. In an embodiment, the transparent panel 233*b* may be formed of a material through which light emitted from the optical sensor 243 or light reflected from the inside of the water container 230 may pass.

According to an embodiment, a hole 2326 may be disposed in the bottom side of the inner case 232. In an embodiment, the hole 2326 may be positioned to face the optical sensor 243 and/or the transparent panel 233b.

The light emitted from the optical sensor 243, the light reflected from the bottom side of the water container 230, or the light reflected from the surface of the water stored in the water container 230 may form an optical path P3 that passes through the transparent panel 233b and the hole 2326 and extends in a substantially vertical direction.

Further, as illustrated in FIGS. 20 and 21, if the water container 230 is not provided with a reflection mirror, the determination method illustrated in the control flowchart of FIGS. 16 and 18 may be applied in substantially the same or similar manner in measuring whether the water container is coupled and the water level of the water container.

FIG. 22 is a control flowchart illustrating a refrigerator according to an embodiment of the disclosure.

Referring to FIG. 22, the optical sensor 243 according to an embodiment of the disclosure may emit light several times or more toward the inside of the water container mounting part 241 through the light emitting element (2210).

In an embodiment, the refrigerator may determine whether a time value (hereinafter, referred to as a light traveling time) between the light emitted from the optical sensor 243 and the light by the optical sensor 243 is smaller than a predefined time value (2220). Here, the predefined time value (hereinafter, referred to as a set time) may refer to a time value taken for light emitted from the optical sensor 243 to reciprocate a distance (S in FIG. 21) between the optical sensor 243 and the transparent panel 233b.

In an embodiment, if the light traveling time is smaller than the set time (Yes in 2220), the refrigerator may exclude light traveling time values smaller than the set time when calculating the traveling distance of light (2230).

In an embodiment, after operation 2230 or if the light traveling time is smaller than the set time (No in operation 2220), the refrigerator may calculate an average of the light traveling times (2240), and then calculate the light traveling distance through Equation 2 described above (2250).

If the light traveling distance is measured, the optical signal emitted from the optical sensor 243, reflected from the transparent panel 233b, and received is excluded, and thus a sensing or determining the accuracy of the optical sensor 243 may be enhanced.

Hereinafter, an embodiment in which a sensing system for detecting whether a water container is coupled, and the water level of the water container is provided in a clothing care device is described.

FIG. 23 is a perspective view illustrating a clothing care device according to an embodiment of the disclosure. FIG. 24 is a cross-sectional view illustrating a clothing care device according to an embodiment of the disclosure.

Referring to FIG. 23, a clothing care device 300 (or a clothing treatment device) according to an embodiment of the disclosure may include a main body 310 or a door 320.

According to various embodiments, the clothing care device 300 may remove or sterilize foreign substances or odors attached to clothes. Further, the clothing care device 300 may automatically perform wrinkle removal, foreign matter removal, or the like upon receiving instructions through button operation or the like corresponding to a type or material of the clothes.

According to an embodiment, the main body 310 may have a substantially hexahedral shape with one open side. A front side of the main body 310 may be opened, e.g., by the door 320. An opening 310a may be formed in the front side of the main body 310.

According to an embodiment, the main body 310 may form a first inner space 3121 in which clothes may be provided or received and treated. The front side of the first inner space 3121 may be opened by, e.g., the door 320. For example, at least a portion of the opening 310a of the main body 310 may be a front side of the first inner space 3121.

According to an embodiment, the door 320 may be provided to open and close the opening 310a of the main body 310. The door 320 may be coupled to the main body 310 by a device, such as e.g., a hinge or a link. The first inner space 3121 may be opened and/or closed using the door 320. Although not shown, an operation unit (not shown) comprised of an input device, such as a button or a touch screen, may be provided on the front side of the door 320.

Referring to FIG. 24, the clothing care device 300 according to an embodiment of the disclosure may include a main body 310, a door 320, an air conditioner 350, a humidifier 360, a blower 370, or a filter assembly 380.

According to an embodiment, the main body 310 may include an outer housing 311 or an inner housing 312. The outer housing 311 or the inner housing 312 may be supported by a frame to maintain its shape.

According to an embodiment, the door 320 may further include a discharge flow path 3130 for discharging air of the first inner space 3121 to outside. The discharge flow path 3130 may be connected to, e.g., a discharge slit 316a, to be described below, when the door 320 is closed.

According to an embodiment, a second inner space 3111 or a third inner space 3112 may be formed between the outer housing 311 and the inner housing 312. The second inner space 3111, e.g., may be positioned at a lower portion of the inner housing 312. In other words, the second inner space 3111 may be positioned at a lower portion of the first inner space 3121. For example, components such as the air conditioner 350 or the humidifier 360 may be disposed in the second inner space 3111. The third inner space 3112, e.g., may be positioned to surround a portion of an upper portion and a portion of a side portion of the inner housing 312. For example, components such as the blower 370 may be disposed in the third inner space 3112.

According to an embodiment, the inner housing 312 may form the first inner space 3121. The first inner space 3121 may form a space by, e.g., an upper side 312a, a lower side 312b, a left side 312c, a right side 312d, and a rear side 312e. The front side of the first inner space 3121 may be open and opened and closed by the door 320. A discharge bracket 316 installed at a position corresponding to the discharge flow path 3130 of the door 320 may be provided at an upper end of the opening 310a of the main body 310. The discharge bracket 316 may include, e.g., a plurality of discharge slits 316a disposed to correspond to the discharge flow path 3130 of the door 320.

According to an embodiment, the clothing care device 300 may further include a drain container 340a or a water supply container 340b. The drain container 340a or the water supply container 340b may be provided to be detachable from the main body 310. The drain container 340a or the water supply container 340b may be disposed, e.g., at a lower portion of the first inner space 3121. The drain container 340a or the water supply container 340b may be drawn into/out of the water container mounting part 317 provided at the lower portion of the first inner space 3121. The drain container 340a or the water supply container 340b may be disposed to be visible from the outside, e.g., when the door 320 is opened.

The drain container 340a may be provided to facilitate condensate treatment by, e.g., a heat exchanger 352 of the air conditioner 350. The water supply container 340b may be provided to store, e.g., water required for generating steam in the humidifier 360. The drain container 340a and the water supply container 340b may not necessarily be configured separately but may be configured as an integral container that serves as both the drain container 340a and the water supply container 340b described above. The drain container 340a and the water supply container 340b may be collectively referred to as the water container 340.

According to an embodiment, the air conditioner 350 may include the heat exchanger 352, a first duct 355, or a first fan 356. The air conditioner 350 may be provided to dehumidify or heat, e.g., air in the first inner space 3121. The air conditioner 350 may be disposed to supply hot air to, e.g., the first inner space 3121. The air conditioner 350 may be disposed, e.g., in the second inner space 3111.

According to an embodiment, the heat exchanger 352 may include an evaporator 3521, a condenser 3522, or a compressor 3523. The refrigerant may circulate through the evaporator 3521, the condenser 3522, and the compressor 3523. The refrigerant may be, e.g., a gas, but is not limited thereto. In the evaporator 3521, the refrigerant may absorb latent heat of the surrounding air while evaporating, condensing moisture in the air. The condensate may move to the drain container 340a. Accordingly, the air introduced through the first inlet 357 may be dehumidified while passing through the evaporator 3521. The refrigerant evaporated in the evaporator 3521 may be compressed at a high pressure in the compressor 3523 and moved to the condenser 3522. The high-pressure refrigerant moved to the condenser 3522 may heat the surrounding air by emitting latent heat toward the surrounding air. Accordingly, the air passing through the evaporator 3521 may be heated in the condenser 3522 and then discharged through the first outlet 358. In summary, as the evaporator 3521 and the condenser 3522 perform a heat exchange function, the air passing through the heat exchanger 352 by the first fan 356 may be dehumidified or heated sequentially through the evaporator 3521 and the condenser 3522.

According to an embodiment, the first duct 355 may be provided to connect the heat exchanger 352 and the first fan 356. The first duct 355 may include, e.g., a first flow path 3551 provided to allow air introduced from the first inner space 3121 to be discharged to the first inner space 3121 through the first fan 356 and the heat exchanger 352.

Air in the first inner space 3121 may be introduced into the first flow path 3551 through the first inlet 357. The first inlet 357 may be provided, e.g., in the lower side 312b of the inner housing 312. Specifically, the first inlet 357 may be provided in front of the lower side 312b (e.g., in the +x-axis direction), but is not limited thereto.

The air dehumidified or heated by the heat exchanger 352 may be discharged to the first inner space 3121 through the first outlet 358. The first outlet 358 may be positioned, e.g., in the lower side 312b of the inner housing 312. The first outlet 358 may be provided so that, e.g., the discharged air is inclined and raised along the direction of the opening 310a but is not limited thereto. In other words, the first outlet 358 may be provided to discharge air in a direction inclined upward from the lower side 312b of the inner housing 312. Accordingly, the air discharged from the first outlet 358 may be directed toward the front upper portion of the first inner space 3121 and then descend to be sucked (or drawn) into the first inlet 357 provided in front of the lower surface 312b of the inner housing 312.

According to an embodiment, the first fan 356 may generate a flow for air circulation in the first inner space 3121. For example, the first fan 356 may suck (e.g., intake) air in the first inner space 3121 from the first inlet 357 and introduce the sucked air into the first duct 355 and may discharge the air introduced into the first duct 355 from the first outlet 358 to the first inner space 3121.

According to an embodiment, the humidifier 360 may include a steam generator 361, a steam supply pipe 362, or a steam injector 363. The humidifier 360 may be provided to generate steam using water supplied from the water supply container 340b and then discharge the steam to the steam outlet 364 via the steam supply pipe 362 and the steam injector 363. The steam outlet 364 may be positioned above, e.g., the first outlet 358. Alternatively, the steam outlet 364 may be positioned at a lower portion on the rear side 312e of the inner housing 312. The steam discharged from the steam outlet 364 may flow from the first outlet 358 to the upper portion of the first inner space 3121, together with the air flown and discharged by the first fan 356.

According to an embodiment, the clothing care device 300 may include an air circulation flow path 354. The air circulation flow path 354 may include the first inlet 357, the first flow path 3551, and the first outlet 358. The first inlet 357, the first flow path 3551 and the first outlet 358 may be sequentially connected in the air circulation flow path 354. The hot and humid air of the first inner space 3121 may be introduced through the first inlet 357. The introduced air may be heated and dehumidified by the heat exchanger 352 while passing through the first flow path 355 to be converted into high-temperature and low-humidity air. Air converted into high-temperature and low-humidity air may be discharged to the first outlet 358.

According to an embodiment, the steam generator 361 may generate steam using water supplied from the water supply container 340b. The steam generator 361 may generate high-temperature steam by heating water using, e.g., a heater provided therein.

The steam supply pipe 362 may be provided to guide, e.g., steam generated by the steam generator 361 to the steam injector 363. The steam injector 363 may be provided at a lower portion of the rear side 312e of the inner housing 312.

According to an embodiment, the humidifier 360 may further include a water supply pump (not shown). The water supply pump may be provided, e.g., between the water supply container 340b and the steam generator 361 to move water stored in the water supply container 340b to the steam generator 361.

According to an embodiment, the blower 370 may include a second duct 371 or a second fan 372. The blower 370 may be disposed, e.g., in the third inner space 3112.

According to an embodiment, the second duct 371 may be provided to allow air to circulate between the first inner space 3121 and the blower 370 through a second inlet 373 and a second outlet 374. In other words, one end of the second duct 371 may be connected to the second inlet 373, and the other end of the second duct 371 may be connected to the second outlet 374. The second duct 371 may include, e.g., a second flow path 3711 through which air circulates. Here, the second inlet 373 may be positioned at an upper portion of the rear side 312e of the inner housing 312 but is not limited thereto. Here, the second outlet 374 may be positioned in the upper side 312a of the inner housing 312 but is not limited thereto.

According to an embodiment, the second fan 372 may be disposed in the second duct 371. The second fan 372 may be operated to generate an air flow so that the air flows from the second inlet 373 to the second outlet 374. When the second fan 372 is operated, the air introduced from the second inlet 373 passes through the second fan 372 and is discharged to the second outlet 374. Air may be discharged downward perpendicular to the upper side of the inner housing 312 but is not limited thereto. Further, the air discharged from the second outlet 374 may pass through a supporting device 325 and flow to a holding member 330. Accordingly, the clothing care device 300 may remove dust or odor of the clothes over the holding member 330 using the air discharged from the second outlet 374.

According to an embodiment, the filter assembly 380 may be disposed at an upper portion of the rear side 312*e* of the inner housing 312. The filter assembly 380 may be disposed, e.g., at a portion where the first inner space 3121 and the second flow path 3711 are connected. In other words, the filter assembly 380 may be disposed in the second inlet 373. The filter assembly 380 may be disposed to filter, e.g., dust before air in the first inner space 3121 is introduced into the blower 370.

According to an embodiment, the clothing care device 300 may further include the supporting device 325 or the holding member 330. The supporting device 325 may be disposed, e.g., on the upper side 312*a* of the inner housing 312. Specifically, the supporting device 325 may be disposed adjacent to the second outlet 374. The supporting device 325 may be provided to support, e.g., a plurality of holding members 330. The plurality of holding members 330 may be provided to be detachable from the supporting device 325.

According to an embodiment, the holding members 330 may include at least two types of holding members. The holding members 330 may include, e.g., a first holding member provided to hold or hang tops, as it pertains to clothing, e.g., jacket or shirt, or a second holding member provided to hold or hang bottoms, as it pertains to clothing, e.g., pants. If necessary, the first holding member or the second holding member may be hung on the supporting device 325.

According to an embodiment, the holding member 330 may be provided to allow air to flow therein. At least one air hole may be formed in the holding member 330 to supply the air flow from the second outlet 374 to the clothes. The air hole may be formed, e.g., at an upper end of the holding member 330, but is not limited thereto, and may be formed in various sizes at various positions to widely inject air into clothing. As the air from the second outlet 374 passes through the holding member 330, dust or foreign substances on the clothes may be removed.

In the case of the filter assembly 380 provided in the clothing care device 300, when air including dust or foreign substances passes through the filter assembly 380 and flows into the blower 370, the air may intensively pass through an upper area (or dust concentration area) Z of the filter assembly 380 and flow into the blower 370. In other words, most of the air in the first inner space 3121 may pass through the upper area Z of the filter assembly 380 and flow into the blower 370. Size and position of the illustrated upper area Z is a mere example and may vary depending on a placement position of the filter assembly 380 or a placement position or specification of the blower 370 in the clothing care device 300.

FIG. 25 is a cross-sectional view illustrating a water container according to an embodiment of the disclosure. FIG. 26 is an enlarged view illustrating a portion of a cross section of a water container according to an embodiment of the disclosure.

The water container 340 illustrated in FIGS. 25 and 26 may be the drain container 340*a*, but the following description of the drain container 340*a* may be applied to the water supply container 340*b* in substantially the same or similar manner.

Referring to FIGS. 25 and 26, the water container 340 according to an embodiment may include a water container main body 341 storing water, a water container handle 342 provided to allow the user to easily grip the water container 340, and a water container cover (not shown) rotatably connected to the water container main body 341 to open and close inside of the water container 340.

According to an embodiment, the clothing care device 300 may include an optical sensor 343 for detecting a water level of the water container 340. The optical sensor 343 may be substantially the same in function, shape, and/or structure as the optical sensor 143 illustrated in FIGS. 4 and 5 and the optical sensor 243 illustrated in FIGS. 20 and 21. The optical sensor 343 may receive power from the clothing care device 300 in a wired/wireless manner.

According to an embodiment, the water container main body 341 may store water therein. In an embodiment, the inside of the water container main body 341 may be divided into a first space 3412 in which water is stored and a second space 3413 in which the optical sensor 343 is disposed by a partition wall 3411. In an embodiment, the first space 3412 may be positioned on a lower side (e.g., in the −z-axis direction) with respect to the partition wall 3411, and the second space 3413 may be positioned on an upper side (e.g., in the +z-axis direction) with respect to the partition wall 3411.

According to an embodiment, a hole 3411*a* may be provided in the partition wall 3411. Although not shown in the drawings, the hole 3411*a* may be provided with a window (not shown) formed of a transparent material through which light emitted from the optical sensor 343 may pass. The light emitted from the optical sensor 343 disposed on an upper side of the partition wall 3411 may travel into the first space 3412 through the hole 3411*a*. Further, the light reflected from a bottom side of the water container 340 or a surface of water stored in the water container 340 may be received by the optical sensor 343 through the hole 3411*a*. Accordingly, the light emitted from the optical sensor 343, the light reflected from the bottom side of the water container 340, or the light reflected from the surface of the water stored in the water container 340 may form an optical path P4 that passes through the hole 3411*a* and extends in a substantially vertical direction.

According to an embodiment, the clothing care device 300 may be configured to measure the water level of the water stored in the water container 340 using the optical sensor 343. For example, the water level of water stored in the water container 340 may be measured using Equations 2 and 3 described above using values measured by the ToF type optical sensor 343.

Hereinafter, various example embodiments of a clothing care device in which an optical sensor is provided outside a water container are described.

FIG. 27 is a cross-sectional view illustrating a state in which a water container is coupled to a water container mounting part of a clothing care device according to an embodiment of the disclosure.

Referring to FIG. 27, the optical sensor 343 may be disposed on one surface of a side 3171 of the water container mounting part 317 of the clothing care device according to an embodiment.

According to an embodiment, the water container 440 may include a water container main body 441 in which water is stored. According to an embodiment, the water container main body 441 may store water therein. In an embodiment, inside of the water container main body 441 may be partitioned into a first space 4412 in which water is stored and a second space 4413 in which the above-described reflection mirror 180 is disposed by a partition wall 4411. In an embodiment, the first space 4412 may be positioned on a lower side (e.g., the −z-axis direction) with respect to the partition wall 4411, and the second space 4413 may be positioned on an upper side (e.g., the +z-axis direction) with respect to the partition wall 4411.

In an embodiment, a hole 4414 may be formed on one side surface 441*a* of the water container main body 441. The hole 4414 may be disposed at a position facing the optical sensor 343. Although not shown in the drawings, the hole 4414 may be provided with a window (not shown) formed of a transparent material through which light emitted from the optical sensor 343 may pass.

According to an embodiment, a hole 4411*a* may be provided in the partition wall 4411. For example, the hole 4411*a* may be formed at a position close to the one surface of the side 3171 of the water container mounting part 317. For example, the hole 441*a* of the partition wall 4411 may be disposed perpendicular to the hole 4414 of the water container main body 441.

According to an embodiment, the reflection mirror 180 may be connected to each of the hole 4414 of the water container main body 441 and the hole 441*a* of the partition wall 4411. The light emitted from the optical sensor 343 may proceed to the second space 4413 through the hole 4414 of the water container main body 441, may be reflected by the reflection surface 182*a* of the reflection mirror 180, and may proceed to the first space 4412 through the hole 4411*a* of the partition wall 4411. Accordingly, the light emitted from the optical sensor 343 may form an optical path P5 including an optical path P5-1 extending in the horizontal direction from the optical sensor 343 toward the reflection mirror 180 and an optical path P5-2 extending in the vertical direction from the reflection mirror 180 toward the bottom side of the water container 440. Further, the light reflected from the water stored in the water container 440 or the bottom side of the water container 440 may proceed along the optical path P5 and be received by the optical sensor 343.

The clothing care device may detect whether the water container 440 is coupled to the water container mounting part 317 through the optical sensor 343 and the water level of the water container 440 when the water container 440 is coupled using Equation 2 and/or Equation 3 described above in substantially the same or similar manner to the optical path P1 illustrated in FIG. 13.

In this drawing, an example in which the light sensor 343 is disposed on the one surface of the side 3171 of the water container mounting part 317 is described, but the disclosure is not limited thereto, and the light sensor 343 may be disposed on a rear side of the water container mounting part 317.

FIG. 28 is a cross-sectional view illustrating a state in which a water container is coupled to a water container mounting part of a clothing care device according to an embodiment of the disclosure.

Referring to FIG. 28, an optical sensor 343 may be disposed on the upper side 3172 of the water container mounting part 317 of the clothing care device according to an embodiment.

According to an embodiment, the water container 540 may include a water container main body 541 in which water is stored. According to an embodiment, the water container main body 541 may store water therein. In an embodiment, the inside of the water container main body 541 may be divided into a first space 5412 in which water is stored and a second space 5413 in which water is not stored by the partition wall 5411. In an embodiment, the first space 5412 may be positioned on a lower side (e.g., the −z-axis direction) with respect to the partition wall 5411, and the second space 5413 may be positioned on an upper side (e.g., the +z-axis direction) with respect to the partition wall 5411.

In an embodiment, a hole 5414 may be formed in an upper side 541*b* of the water container main body 541. The hole 5414 may be disposed at a position facing the optical sensor 343. Although not specifically shown in the drawing, the hole 5414 may be provided with a window (not shown) formed of a transparent material through which light emitted from the optical sensor 343 may pass.

According to an embodiment, a hole 5411*a* may be provided in the partition wall 5411. For example, the hole 5411*a* of the partition wall 5411 may be disposed to face the hole 5414 of the water container main body 541.

A look at a path of the light emitted from the optical sensor 343 or the light received by the optical sensor 343, the light emitted from the optical sensor 343 may travel along an optical path P6 extending in the vertical direction through the hole 5414 of the water container main body 541 and the hole 5411*a* of the partition wall 5411. Further, the light reflected from the water stored in the water container 540 or a bottom side of the water container 540 may proceed along the optical path P6 and be received by the optical sensor 343.

the clothing care device may detect whether the water container 540 is coupled to the water container mounting part 317 through the optical sensor 343 and a water level of the water container 540 when the water container 540 is coupled using Equation 2 and/or Equation 3 described above in substantially the same or similar manner to the optical path P3 illustrated in FIG. 20.

What is claimed is:

1. A refrigerator, comprising:
a main body including a storage compartment;
a door rotatably connected to the main body;
a water container mounting part disposed in the door;
a water container coupleable to and decoupleable from the water container mounting part; and
an optical sensor, disposed on one surface of a side of the water container mounting part, configured to detect whether the water container is coupled to the water container mounting part or to detect a water level of the water container coupled to the water container mounting part,
wherein the water container includes a reflection mirror disposed at an edge of the water container and inclined to face the optical sensor at an angle, the reflection mirror configured to guide light emitted from the optical sensor to a bottom side of the water container and guide light reflected from the bottom side or light reflected by water stored in the water container to the optical sensor.

2. The refrigerator of claim 1, further comprising:
a controller configured to calculate a light traveling distance based on a time value of light emitted from a light emitting element of the optical sensor and received by a light receiving element of the optical sensor, and determine whether the water container is coupled to the water container mounting part and measure the water level of the water container coupled to the water container mounting part based on the calculated light traveling distance.

3. The refrigerator of claim 2, wherein the controller is configured to:

determine whether the water container is coupled to the water container mounting part by comparing the calculated light traveling distance with a predefined first light traveling distance; and based on the light traveling distance not being substantially same as the predefined first light traveling distance, determine that the water container is coupled to the water container mounting part.

4. The refrigerator of claim 3, wherein the controller is configured to:

based on the light traveling distance being substantially same as the predefined first light traveling distance, calculate a dispersion of time values measured for a predetermined time and determine whether the water container is coupled to the water container mounting part considering the calculated dispersion; and determine that the water container is not coupled to the water container mounting part based on the dispersion being smaller than a predefined dispersion and determine that the water container is coupled to the water container mounting part based on the dispersion being larger than the predefined dispersion.

5. The refrigerator of claim 2, wherein any one of an anti-reflection structure, a diffuse-reflection structure, a hole, and an inclined structure is disposed on another surface of the side of the water container mounting part, facing the one surface of the side.

6. The refrigerator of claim 5, wherein the controller is configured to:

determine whether the calculated light traveling distance is a predefined minimum value or more; and based on the calculated light traveling distance being smaller than the predefined minimum value, determine that the water container is not coupled to the water container mounting part.

7. The refrigerator of claim 1, further comprising an output device disposed in one area of the water container mounting part and configured to output whether the water container is coupled to the water container mounting part or the water level of the water container coupled to the water container mounting part.

8. The refrigerator of claim 2, wherein the controller is configured to:

based on the water container being coupled to the water container mounting part, determine whether the water container is empty by comparing the calculated light traveling distance with a predefined second light traveling distance; and determine that the water container is empty based on the light traveling distance being substantially same as the predefined second light traveling distance and determine that the water container is not empty based on the light traveling distance not being substantially same as the predefined second light traveling distance.

9. The refrigerator of claim 8, further comprising:

a water supply valve to adjust water supply to the water container; and an input device disposed in one area of the water container mounting part and configured to receive a command regarding water supply from a user, wherein the controller is configured to:

while the water container is empty, control the water supply valve to allow the water level of the water container to reach a target water supply level based on the target water supply level being input to the input device and control the water supply valve to allow the water level of the water container to reach a predefined water level based on the target water supply level not being input to the input device.

10. The refrigerator of claim 8, further comprising:

a water supply valve to adjust water supply to the water container; and an input device disposed in one area of the water container mounting part and configured to receive a command regarding water supply from a user, wherein the controller is configured to:

based on the water container being determined not to be empty, determine whether the water level of the water container is at a full water level; and based on the water level of the water container being determined not to be at the full water level, control the water supply valve to allow the water level of the water container to reach a target water supply level based on the target water supply level being input to the input device and control the water supply valve to allow the water level of the water container to reach a predefined water level based on the target water supply level not being input to the input device.

11. The refrigerator of claim 1, wherein the water container includes:

a water container main body; and an inner case disposed in the water container main body and having a first opening formed in one surface of a side and a second opening, adjacent to the first opening, formed in a bottom side perpendicular to the one surface of the side, and wherein the reflection mirror includes a reflection surface connected to each of the first opening and the second opening.

12. The refrigerator of claim 11, wherein the reflection mirror is disposed in a corner of the inner case.

13. The refrigerator of claim 11, wherein the reflection surface has an inclination from the first opening or the second opening.

14. The refrigerator of claim 11, wherein a surface of the reflection surface is plated with a high-reflectivity metal or coated with a high-reflectivity paint.

15. The refrigerator of claim 11, wherein the reflection surface has a concave shape.

16. The refrigerator of claim 1, wherein a separation distance (g) between the optical sensor and the water container is 2 mm or less.

17. A refrigerator, comprising:

a main body including a storage compartment;

a door rotatably connected to the main body;

a water container mounting part disposed in the door;

a water container coupleable to and decoupleable from the water container mounting part; and an optical sensor, disposed relative to an upper side of the water container mounting part, configured to detect whether the water container is coupled to the water container mounting part or detect a water level of the water container coupled to the water container mounting part, wherein the water container includes:

a water container main body having an upper side that is open;

an inner case disposed in the water container main body, a water container cover to cover the upper side of the water container main body, the water container cover including a transparent panel disposed to face the optical sensor; and wherein the inner case includes a hole formed in an upper side to be positioned to face the transparent panel.

18. The refrigerator of claim 17, wherein a separation distance between the optical sensor and the transparent panel is 2 mm or more.

19. The refrigerator of claim 17, further comprising a controller configured to calculate a light traveling distance based on a time value of light emitted from a light emitting element of the optical sensor and received by a light receiving element of the optical sensor and determine whether the water container is coupled to the water container mounting part and measure the water level of the water container coupled to the water container mounting part based on the calculated light traveling distance, wherein the controller is configured to:

control the light emitting element to emit light into an inside of the water container mounting part several times or more; and exclude time values lower than a predefined time among time values based on light being emitted from the light emitting element and is received by the light receiving element based on calculating the light traveling distance.

20. A water container coupleable to a home appliance that includes an optical sensor, the water container comprising:

a water container main body to store water;

an inner case, disposed in the water container main body, having a first opening on one surface of a side and a second opening adjacent to the first opening on a bottom side perpendicular to the one surface of the side; and a reflection mirror disposed to face the optical sensor and configured to guide light emitted from the optical sensor to a bottom side of the water container and guide light reflected from the bottom side and light reflected by water stored in the water container to the optical sensor, wherein the reflection mirror includes a reflection surface to be connected to each of the first opening and the second opening.

* * * * *